US012580247B2

(12) United States Patent
Thayer

(10) Patent No.: US 12,580,247 B2
(45) Date of Patent: Mar. 17, 2026

(54) BATTERY PACK APPARATUS

(71) Applicant: Rivian IP Holdings, LLC, Irvine, CA (US)

(72) Inventor: Brandon Thayer, Aliso Viejo, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 942 days.

(21) Appl. No.: 17/730,538

(22) Filed: Apr. 27, 2022

(65) Prior Publication Data

US 2023/0352768 A1 Nov. 2, 2023

(51) Int. Cl.
| | |
|---|---|
| *H01M 10/6557* | (2014.01) |
| *H01M 10/613* | (2014.01) |
| *H01M 10/625* | (2014.01) |
| *H01M 10/643* | (2014.01) |
| *H01M 10/6556* | (2014.01) |

(52) U.S. Cl.
CPC ..... *H01M 10/6557* (2015.04); *H01M 10/613* (2015.04); *H01M 10/625* (2015.04); *H01M 10/643* (2015.04); *H01M 10/6556* (2015.04); *H01M 2220/20* (2013.01)

(58) Field of Classification Search
CPC ............. H01M 10/613; H01M 10/625; H01M 10/643; H01M 10/6556; H01M 10/6557; H01M 2220/20
See application file for complete search history.

(56) References Cited

U.S. PATENT DOCUMENTS

| | | | |
|---|---|---|---|
| 2017/0047624 A1 | 2/2017 | Gunna et al. | |
| 2021/0320343 A1* | 10/2021 | Flannery | ........... H01M 10/6568 |

FOREIGN PATENT DOCUMENTS

| | | | | |
|---|---|---|---|---|
| CN | 108550955 A | * | 9/2018 | .......... H01M 10/613 |
| CN | 210778888 U | * | 6/2020 | |
| CN | 112151724 A | * | 12/2020 | .............. B60L 50/66 |
| CN | 214313326 U | * | 9/2021 | |
| GB | 2549512 A | * | 10/2017 | .......... H01M 10/625 |

OTHER PUBLICATIONS

English_Translation_of_CN_108550955_A (Year: 2018).*
English_Translation_of_CN_112151724_A (Year: 2020).*
English Translation of CN_214313326_U (Year: 2021).*
https://www.proterra.com/products/battery-technology/.

* cited by examiner

*Primary Examiner* — Niki Bakhtiari
*Assistant Examiner* — Dustin Van Kirk
(74) *Attorney, Agent, or Firm* — Foley & Lardner LLP

(57) ABSTRACT

The apparatus can include a first member defining a first channel. The apparatus can include a second member defining a second channel. The first member can be configured to interface with a first side of a battery cell and the second member can be configured to interface with a second side of the battery cell.

15 Claims, 13 Drawing Sheets

BATTERY PACK APPARATUS

INTRODUCTION

Battery packs can be a source of electrical power. Battery packs can be assembled with various components.

SUMMARY

Battery packs, such as those used for electric vehicles, can generate heat. The technical solution described herein includes structural members that have channels that can facilitate heat transfer from sides of battery cells of a battery pack. The structural members can supplement or replace a designated thermal system (e.g., cold plates) of the battery pack.

At least one aspect is directed to an apparatus. The apparatus can include a first member defining a first channel. The apparatus can include a second member defining a second channel. The first member can be configured to interface with a first side of a battery cell and the second member can be configured to interface with a second side of the battery cell.

At least one aspect is directed to a battery pack. The battery pack can include a housing. The battery pack can include a battery cell disposed within the housing. The battery pack can include a first member defining a first channel. The battery pack can include a second member defining a second channel. The first member can be configured to interface with a first side of the battery cell and the second member can be configured to interface with a second side of the battery cell.

At least one aspect is directed to a method. The method can include providing a first member and a second member. The first member can define a first channel and the second member can define a second channel. The method can include interfacing the first member with a first side of a battery cell. The method can include interfacing the second member with a second side of the battery cell.

At least one aspect is directed to an electric vehicle. The electric vehicle can include a battery pack. The battery pack can include a housing and an apparatus disposed at least partially within the housing. The apparatus can include a battery cell. The apparatus can include a first member defining a first channel. The first member can have a side. The apparatus can include a second member defining a second channel. The second member can have a side. The side of the first member can be configured to interface with a first side of a battery cell and the side of the second member can be configured to interface with a second side of the battery cell.

At least one aspect is directed to a system. The system can include a manifold. The system can include a first member fluidly coupled with the manifold. The first member can define a first channel. The system can include a second member fluidly coupled with the manifold. The second member can define a second channel. The system can include a battery cell configured to thermally couple with the first channel and the second channel.

At least one aspect is directed to a method. The method can include providing an apparatus. The apparatus can include a first member defining a first channel. The first member can have a side. The apparatus can include a second member defining a second channel. The second member can have a side. The side of the first member can be configured to interface with a first side of a battery cell and the side of the second member can be configured to interface with a second side of the battery cell.

At least on aspect is directed to an apparatus. The apparatus can include a member defining a first channel and a second channel. The first channel can be disposed along a first side of the member and the second channel can be disposed along a second side of the member. The first side of the member can be configured to interface with a side of a first battery cell and the second side of the member can be configured to interface with a side of a second battery cell.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
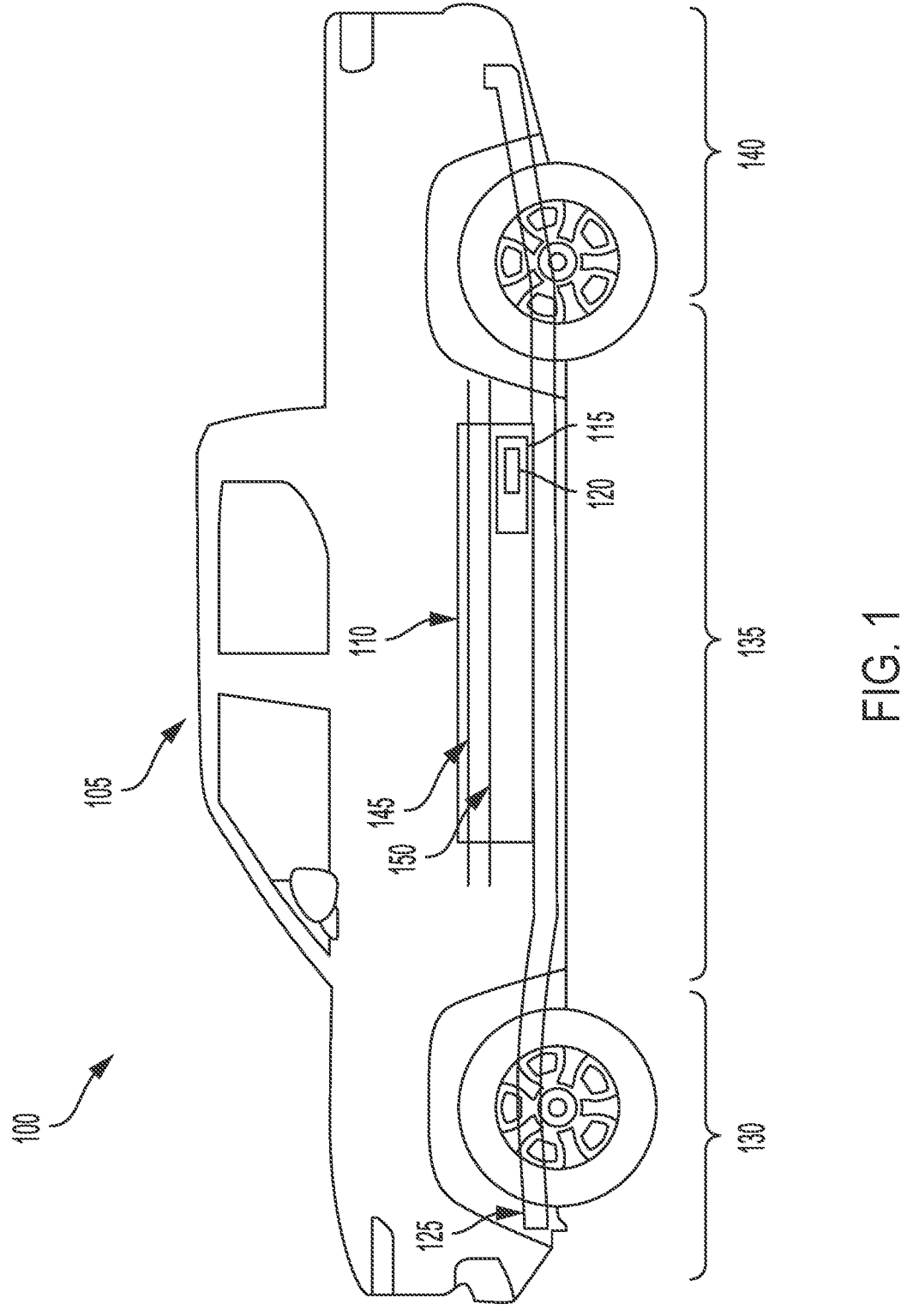
FIG. 1 depicts an example electric vehicle, in accordance with some aspects.

Following below are more detailed descriptions of various concepts related to, and implementations of, methods, apparatuses, and systems to facilitate thermal control of a battery pack or components thereof. The various concepts introduced above and discussed in greater detail below may be implemented in any of numerous ways.

The present disclosure is generally directed to structural members of a battery pack designed to provide thermal control (e.g., cooling) to battery cells of the battery pack to supplement or replace a designated thermal system (e.g., cold plates).

A structural member of a battery pack can define a channel through which coolant can flow to provide thermal control for the battery pack. The channel can extend a length of the structural member. The channel can define a single pass system such that the coolant flows from a first end of the structural member to a second end of the structural member via a single longitudinal direction. The channel can also define a multiple pass system. For example, the channel can define a double pass system such that the coolant flows from the first end of the structural member toward the second end via a first pass (e.g., in a first longitudinal direction) and then returns to the first end to exit the member via a second pass (e.g., in a second longitudinal direction). The channel can define any number of passes. The path of the channel can also vary. For example, each pass of the channel can be substantially straight from the first end of the structural member to the second end, or each pass can be not straight (e.g., have a sinusoidal, serpentine, zig-zag, symmetrical, or asymmetrical pattern).

A first structural member defining a first channel can be disposed adjacent to a battery cell of the battery pack. A first side of the first structural member can interface (directly or indirectly) with a first side of the battery cell to thermally couple the first channel with the battery cell. A second structural member defining a second channel can be disposed adjacent to the battery cell. A first side of the second structural member can interface (directly or indirectly) with a second side of the battery cell to thermally couple the second channel with the battery cell. Coolant can flow through the first and second channels and absorb heat generated by the battery cell. A plurality of battery cells can be disposed between the first and second structural members. A first side of each of the battery cells can interface with the first side of the first structural member and a second side of each battery cells can interface with the first side of the second structural member. There can also be more than two structural members. Each structural member can be separated from another structural member by at least one battery cell.

The disclosed solutions have a technical advantage of providing thermal control to a battery assembly without incorporating distinct thermal components to the battery assembly. For example, without thermal control, the battery assembly can include structural members and battery cells. Instead of adding distinct thermal elements in addition to the structural members and battery cells, the disclosed solution incorporates a thermal (e.g., cooling) element within the structural members. Incorporating the thermal elements into preexisting components can reduce the overall size or weight of the battery assembly, reduces the number of components within the battery assembly, and can simplify the manufacture or assembly of the battery assembly.

FIG. 1 depicts is an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2A:
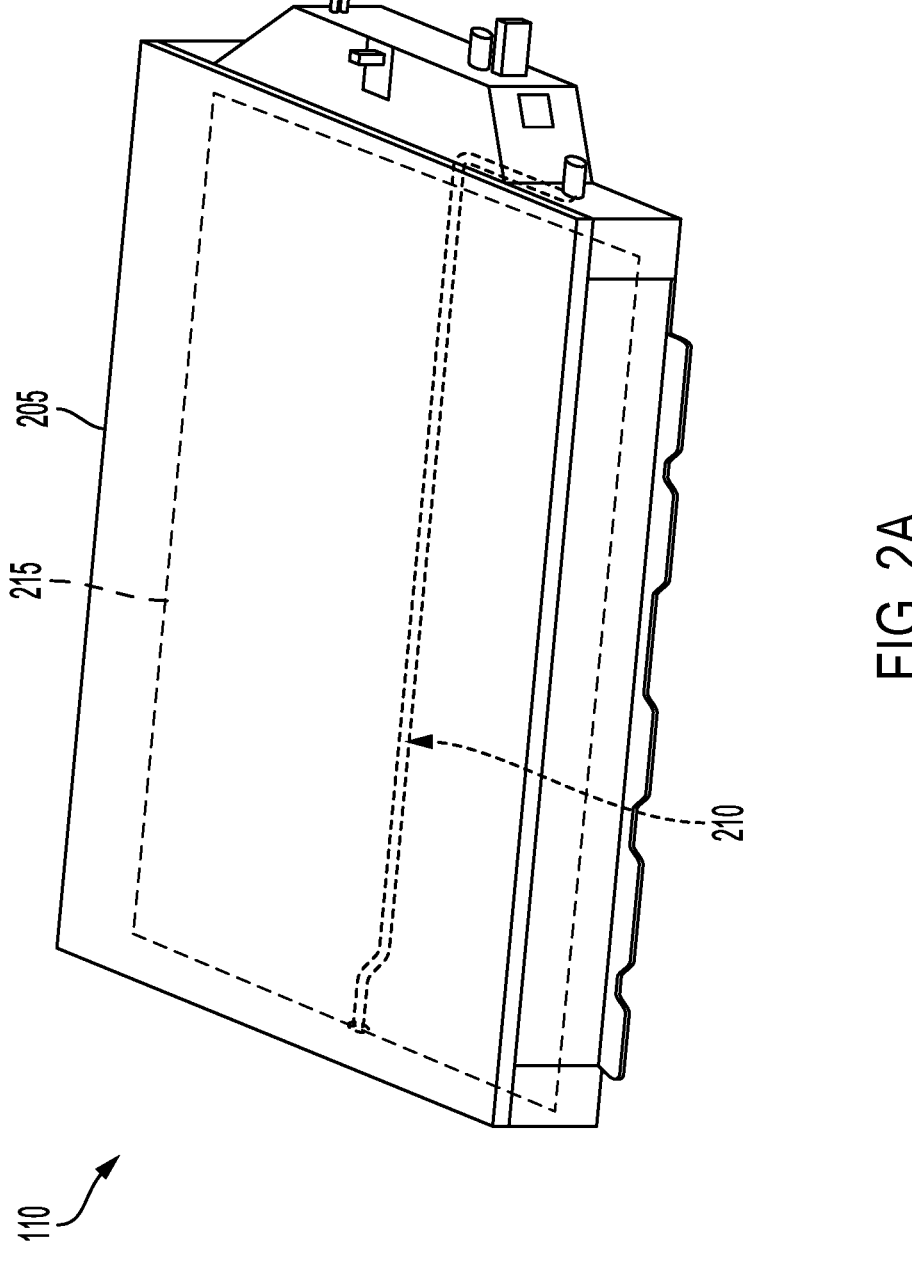
FIG. 2A depicts an example battery pack, in accordance with some aspects.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom or underneath the battery module 115 to protect the battery module 115 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
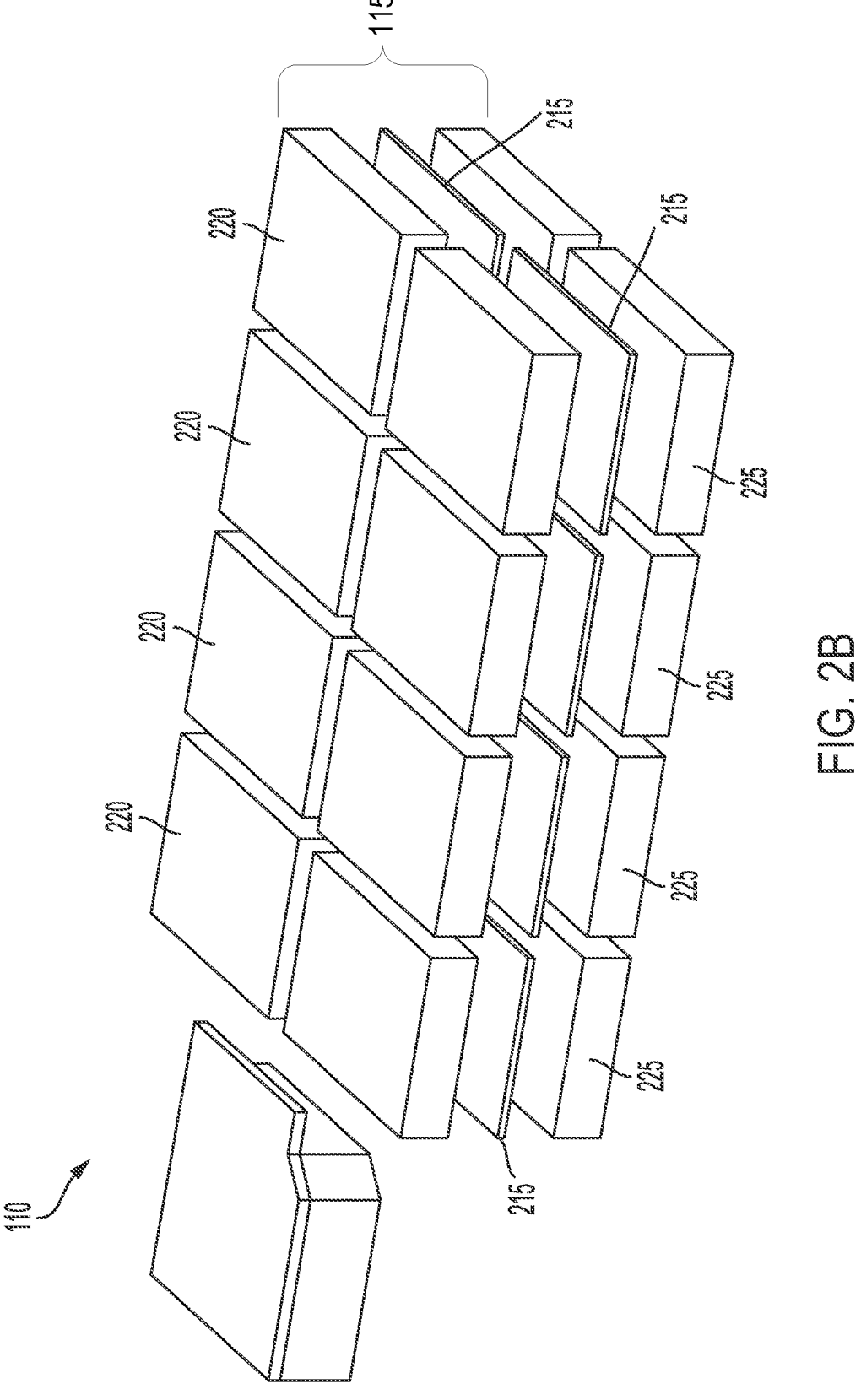
FIG. 2B depicts example battery modules, in accordance with some aspects.
Figure 2C:
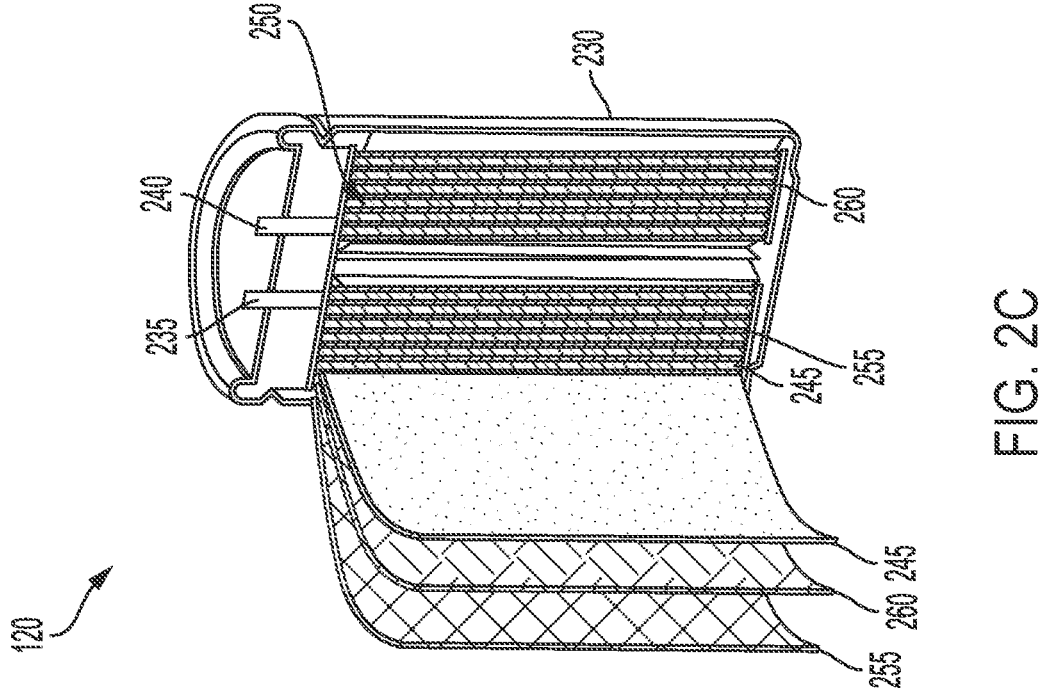
FIG. 2C depicts a cross-sectional view of an example battery cell, in accordance with some aspects.

FIG. 2B depicts example battery modules 115, and FIG. 2C depicts an example cross sectional view of a battery cell 120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells, prismatic cells, or pouch cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Battery cells 120 have a variety of form factors, shapes, or sizes. For example, battery cells 120 can have a cylindrical, rectangular, square, cubic, flat, or prismatic form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can generate or provide electric power for the battery cell 120. A first portion of the electrolyte material can have a first polarity, and a second portion of the electrolyte material can have a second polarity. The housing 230 can be of various shapes, including cylindrical or rectangular, for example. Electrical connections can be made between the electrolyte material and components of the battery cell 120. For example, electrical connections with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include lithium-ion battery cells. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Yet further, some battery cells 120 can be solid state battery cells and other battery cells 120 can include liquid electrolytes for lithium-ion battery cells.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted), elliptical, or ovular base, among others. The shape of the housing 230 can also be prismatic with a polygonal base, such as a triangle, a square, a rectangle, a pentagon, and a hexagon, among others. The housing 230 can be rigid or not rigid (e.g., flexible).

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others.

The battery cell 120 can include at least one anode layer 245, which can be disposed within the cavity 250 defined by the housing 230. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural Graphite, or blended), lithium titanate ($Li_4Ti_5O_{12}$), or a silicon-based material (e.g., silicon metal, oxide, carbide, pre-lithiated).

The battery cell 120 can include at least one cathode layer 255 (e.g., a composite cathode layer compound cathode layer, a compound cathode, a composite cathode, or a cathode). The cathode layer 255 can be disposed within the cavity 250. The cathode layer 255 can output electrical current out from the battery cell 120 and can receive electrons during the discharging of the battery cell 120. The cathode layer 255 can also release lithium ions during the discharging of the battery cell 120. Conversely, the cathode layer 255 can receive electrical current into the battery cell 120 and can output electrons during the charging of the battery cell 120. The cathode layer 255 can receive lithium ions during the charging of the battery cell 120.

The battery cell 120 can include an electrolyte layer 260 disposed within the cavity 250. The electrolyte layer 260 can be arranged between the anode layer 245 and the cathode layer 255 to separate the anode layer 245 and the cathode layer 255. The electrolyte layer 260 can transfer ions between the anode layer 245 and the cathode layer 255. The electrolyte layer 260 can transfer cations from the anode layer 245 to the cathode layer 255 during the operation of the battery cell 120. The electrolyte layer 260 can transfer anions (e.g., lithium ions) from the cathode layer 255 to the anode layer 245 during the operation of the battery cell 120.

The electrolyte layer 260 can include or be made of a liquid electrolyte material. The liquid electrolyte material can include a lithium salt dissolved in a solvent. The lithium salt for the liquid electrolyte material for the electrolyte layer 260 can include, for example, lithium tetrafluoroborate (LiBF$_4$), lithium hexafluorophosphate (LiPF$_6$), and lithium perchlorate (LiClO$_4$), among others. The solvent can include, for example, dimethyl carbonate (DMC), ethylene carbonate (EC), and diethyl carbonate (DEC), among others. The electrolyte layer 260 can include or be made of a solid electrolyte material, such as a ceramic electrolyte material, polymer electrolyte material, or a glassy electrolyte material, or among others, or any combination thereof. The ceramic electrolyte material for the electrolyte layer 260 can include, for example, lithium phosphorous oxy-nitride (Li$_x$PO$_y$N$_z$), lithium germanium phosphate sulfur (Li$_{10}$GeP$_2$S$_{12}$), Yttria-stabilized Zirconia (YSZ), NASICON (Na$_3$Zr$_2$Si$_2$PO$_{12}$), beta-alumina solid electrolyte (BASE), perovskite ceramics (e.g., strontium titanate (SrTiO$_3$)), among others. The polymer electrolyte material (e.g., a hybrid or pseudo-solid state electrolyte) for electrolyte layer 260 can include, for example, polyacrylonitrile (PAN), polyethylene oxide (PEO), polymethyl-methacrylate (PMMA), and polyvinylidene fluoride (PVDF), among others. The glassy electrolyte material for the electrolyte layer 260 can include, for example, lithium sulfide-phosphor pentasulfide (Li$_2$S—P$_2$S$_5$), lithium sulfide-boron sulfide (Li$_2$S—B$_2$S$_3$), and Tin sulfide-phosphor pentasulfide (SnS—P$_2$S$_5$), among others.

Figure 2D:
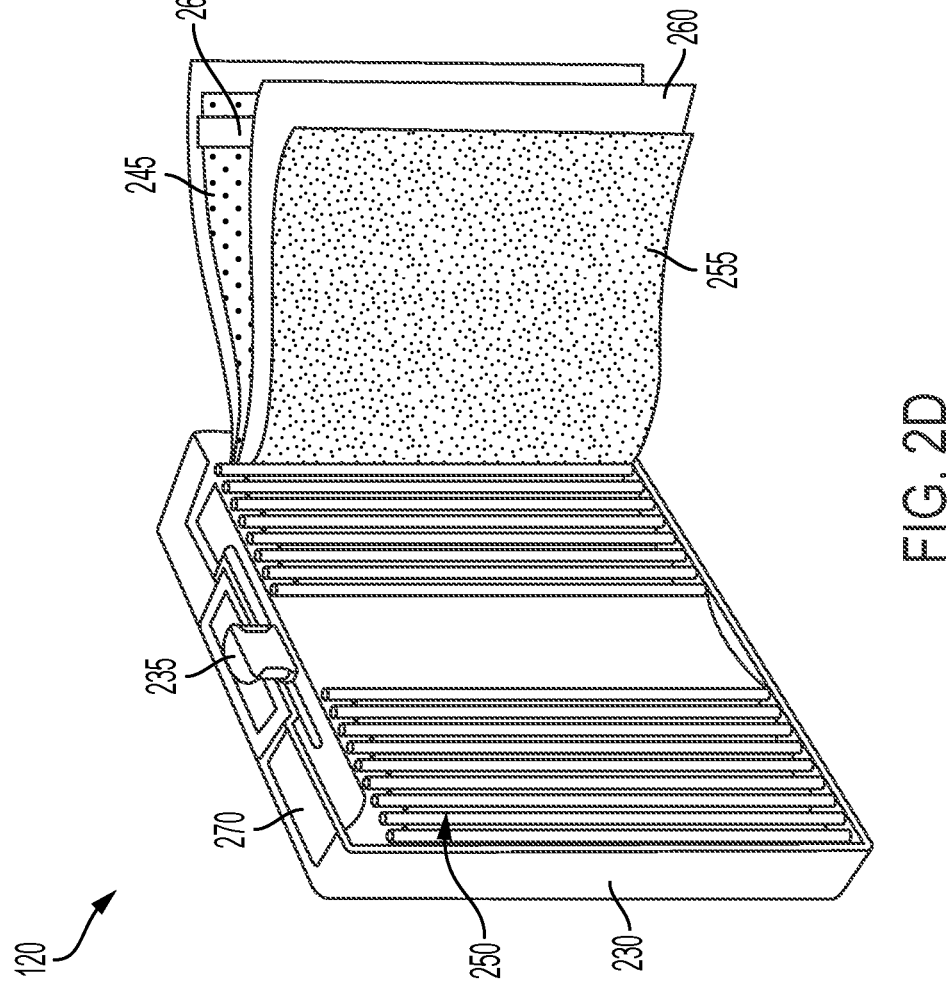
FIG. 2D depicts a cross-sectional view of an example battery cell, in accordance with some aspects.

FIG. 2D depicts an example cross-sectional view of a battery cell 120. The battery cell 120 can be or include a prismatic battery cell 120. The prismatic battery cell 120 can have a housing 230 that defines a rigid enclosure. The housing 230 can have a polygonal base, such as a triangle, square, rectangle, pentagon, among others. For example, the housing 230 of the prismatic battery cell 120 can define a rectangular box. The prismatic battery cell 120 can include at least one anode layer 245, at least one cathode layer 255, and at least one electrolyte layer 260 disposed within the housing 230. The prismatic battery cell 120 can include a plurality of anode layers 245, cathode layers 255, and electrolyte layers 260. For example, the layers 245, 255, 260 can be stacked or in a form of a flattened spiral. The prismatic battery cell 120 can include an anode tab 265. The anode tab 265 can contact the anode layer 245 and facilitate energy transfer between the prismatic battery cell 120 and an external component. For example, the anode tab 265 can exit the housing 230 or electrically couple with a positive terminal 235 to transfer energy between the prismatic battery cell 120 and an external component.

The prismatic battery cell 120 can also include a pressure vent 270. The pressure vent 270 can be disposed in the housing 230. The pressure vent 270 can provide pressure relief to the prismatic battery cell 120 as pressure increases within the prismatic battery cell 120. For example, gases can build up within the housing 230 of the prismatic battery cell 120. The pressure vent 270 can provide a path for the gases to exit the housing 230 when the pressure within the prismatic battery cell 120 reaches a threshold.

Figure 2E:
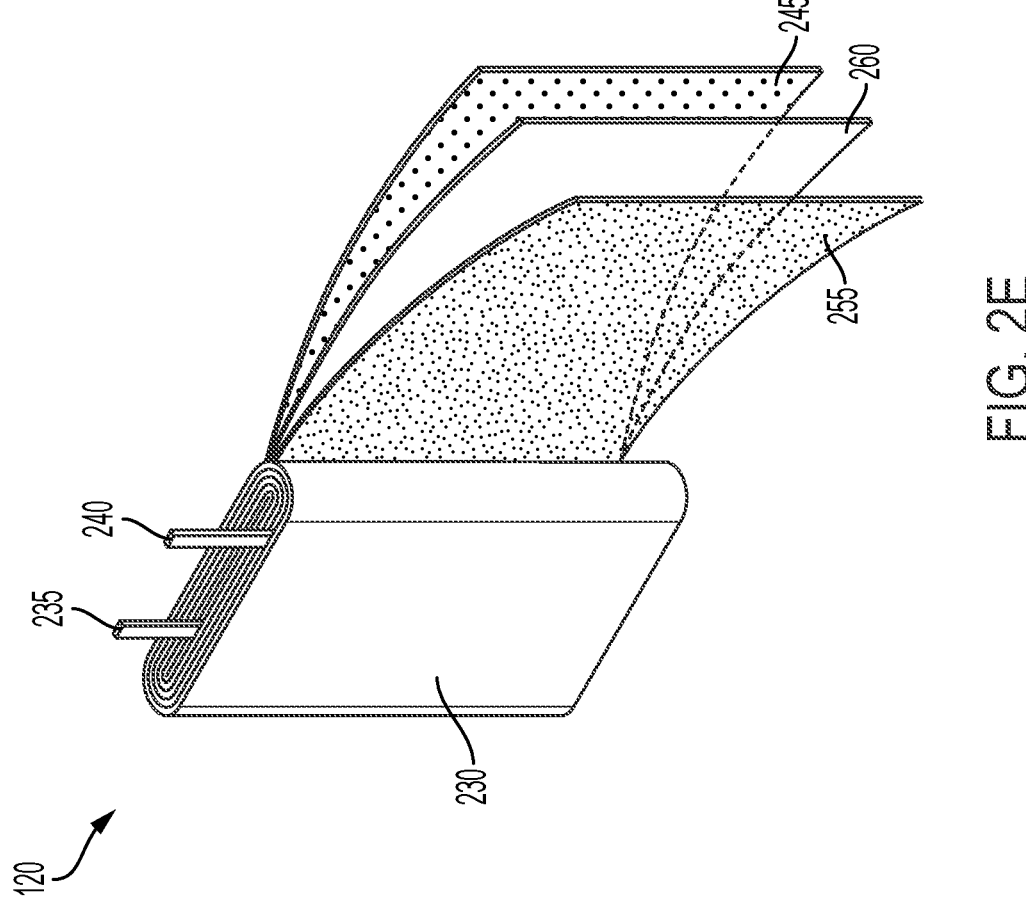
FIG. 2E depicts a perspective view of an example battery cell, in accordance with some aspects.

FIG. 2E depicts an example perspective view of a battery cell 120. The battery cell 120 can be or include a pouch battery cell 120. The pouch battery cell 120 can be similar to the prismatic battery cell 120, but without a rigid enclosure. For example, the pouch battery cell 120 can have a housing 230. The housing 230 can include a flexible material and define a flexible enclosure. For example, the housing 230 can include a soft polymer aluminum plastic film and can be deformable. The housing 230 can comprise any shape. The pouch battery cell 120 can include at least one anode layer 245, at least one cathode layer 255, and at least one electrolyte layer 260 disposed within the housing 230. The pouch battery cell 120 can include a plurality of anode layers 245, cathode layers 255, and electrolyte layers 260. For example, the layers 245, 255, 260 can be stacked or in a form of a flattened spiral.

Figure 3:
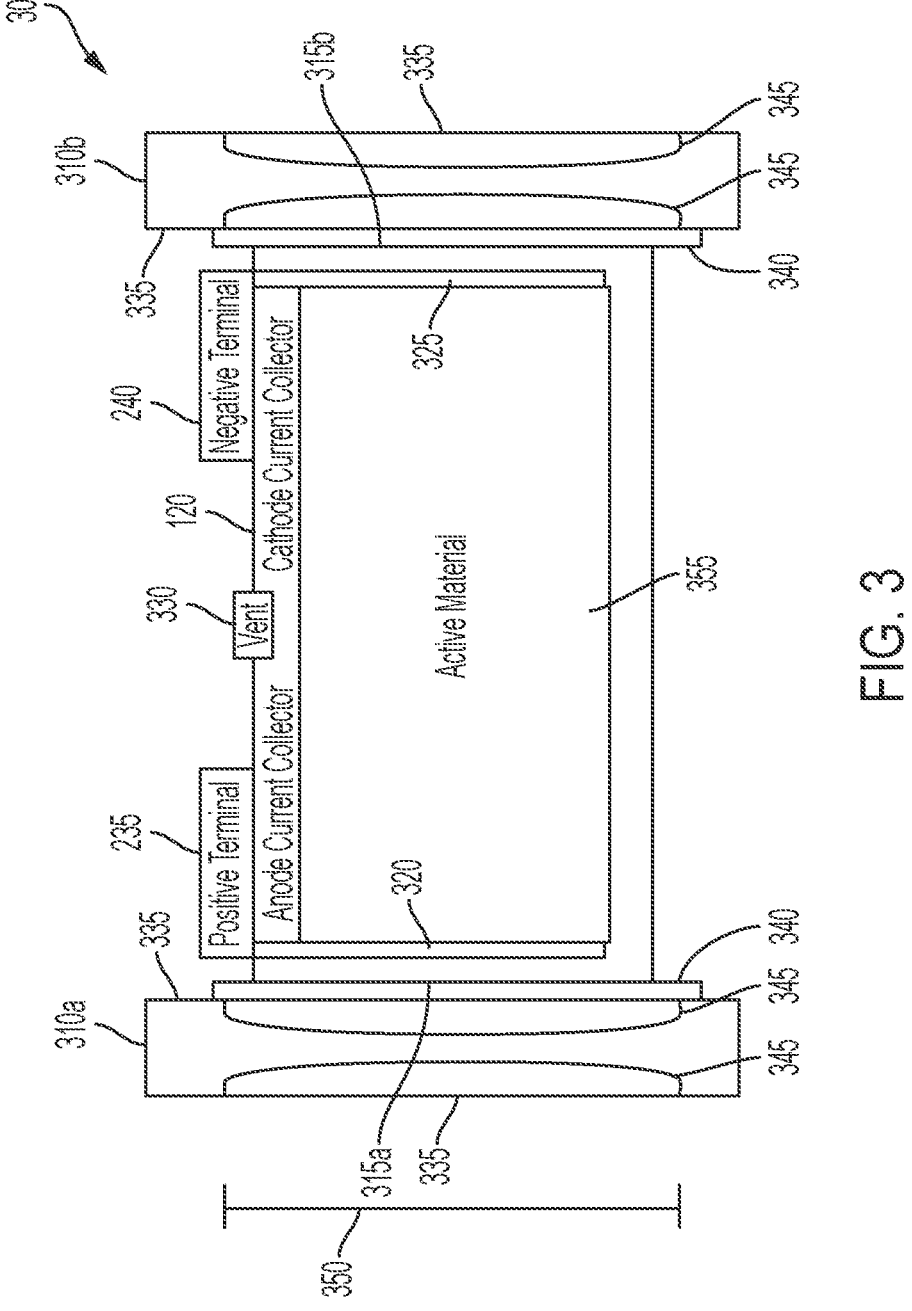
FIG. 3 depicts a cross-sectional view of an example apparatus, in accordance with some aspects.

FIG. 3 depicts an example apparatus 300. Apparatus 300 can be or can include at least one battery assembly. Apparatus 300 can be a part of the electric vehicle 105. For example, apparatus 300 can be or can include battery pack 110. Apparatus 300 can include at least one battery cell 120 and at least one member 310 (e.g., 310a, 310b). The battery cell 120 can be any shape or have any form. For example, the battery cell 120 can be a prismatic battery cell, a cylindrical battery cell, a button battery cell, a pouch battery cell, among others. The battery cell 120 can include at least one battery cell side 315 (e.g., sides 315a and 315b). The battery cell 120 can include a plurality of battery cell sides 315. For example, the battery cell 120 can include a first battery cell side 315 and a second battery cell side 315. The plurality of battery cell sides 315 can be configured to facilitate heat transfer between the battery cell 120 and another component, for example, the member 310. The battery cell 120 can include an active material 355 (e.g., a jelly roll). The battery cell 120 can include at least one first polarity (e.g., positive) terminal 235 and at least one second polarity (e.g., negative) terminal 340. The terminals 235, 240 can be made from electrically conductive materials to carry electrical current from the battery cell 120 to an electrical load, such as a component or system of the electric vehicle 105. The battery cell 120 can include at least one first polarity (e.g., anode) current collector 320 and at least one second polarity (e.g., cathode) current collector 325. The anode current collector 320 can be disposed at or adjacent to the first battery cell side 315 and the cathode current collector 325 can be disposed at or adjacent to the second battery cell side 315. The anode current collector 320 can be mechanically coupled with the positive terminal 235 of the battery cell 120 and the cathode current collector 320 can be mechanically coupled with the negative terminal 240 of the battery cell 120. The anode and cathode current collectors 320, 325 can collect current and conduct flow of the current between the active material 355 of the battery cell 120 and the terminals 235, 240. The battery cell 120 can also include a vent 330. For example, the vent 330 can be disposed on a top side of the battery cell 120. The vent 330 can provide a path for gases to be released from the battery cell 120.

The member 310 can facilitate thermal control of the apparatus 300. For example, the member 310 can be configured to facilitate heat transfer to or from the battery cell 120. For example, the member 310 can be or can include a thermal component 215. The member 310 can be configured to interface with a battery cell 120. The member 310 can include at least one member side 335. The member side 335 can be configured to interface with a battery cell side 315, either directly or indirectly. For example, to directly interface, the member side 335 can contact the battery cell side 315. A geometry of the member side 335 can be complementary to a geometry of the battery cell side 315. For example, the member side 335 can have a planar (e.g., flat) surface to interface with a planar surface of the battery cell side 315. The member side 335 can have any geometry configured to interface with a complementary geometry of the battery cell side 315. To indirectly interface, at least one element 340 can be disposed between the member side 335 and the battery cell side 315. For example, the element 340 can be a gap pad configured to fill any space between the battery cell 120 and the member 310. For example, the space can be due to size of the battery cell 120, size of the member 310, differences in geometry between the battery cell side 315 and the member side 335, or other factors. The element 340 can comprise any material with thermal properties configured to facilitate heat transfer between the battery cell 120 and the member 310.

The member 310 can also be a structural component of the apparatus 300. For example, the member 310 can provide support to the apparatus 300 or to components within the apparatus 300. For example, member 310 can be an external wall of the apparatus 300. As an external wall, the member 310 can provide protection to other internal components of the apparatus 300, define the shape of the apparatus 300, among other functions. The member 310 can also provide structure or support to other components of the apparatus 300. For example, the member 310 can be a structural member disposed within apparatus 300. The member 310 can define areas for other components (e.g., bays, pods, compartments), can support a top and a bottom structure of the apparatus 300, among other functions. The members 310 can be positioned with any orientation with respect to the apparatus 300. For example, the member 310 can extend longitudinally, laterally, or diagonally in the apparatus 300. The member 310 can extend a full distance of the apparatus 300 or can extend a partial distance of the apparatus 300.

The member 310 can be any material, or combination of materials, configured to provide the support and thermal control functions described herein. For example, the member 310 can comprise a rigid material capable of retaining a shape and providing structure to the apparatus. The member 310 can comprise a conductive material such that heat can transfer through the member side 335 between the battery cell 120 and the channel 345. The member 310 can comprise a single material that can support the apparatus and facilitate the heat transfer, or the member 310 can comprise a plurality of materials. For example, the member 310 can comprise a hard plastic for a majority of its structure to support the apparatus, and have a conductive metal as the member side 335 to facilitate the heat transfer between the battery cell 120 and the channel 345. The member 310 can also have any shape. While an elongated, rectangular shape is used as an example through this disclosure, the member 310 can take any shape, form, or orientation capable of performing the structural and thermal functions described herein. Member 310 can be formed by any process. For example, member 310 can be an extrusion. For example, the member 310 can be formed by undergoing plastic deformation and being passed through an orifice or a die. The extrusion can be configured to interface with a first battery cell side 315 and a second battery cell side 315 to thermally control the battery cell 120. The member 310 can also be casted, stamped, brazed, welded, among others. The shape and other characteristics of the member 310 can be based on the type of battery cell. For example, the member 310 can have flat surface to interface with a flat surface of the battery cell side 315 of a prismatic battery cell. The member 310 can have curved surfaces to interface with a curved battery cell side 315 of a cylindrical battery cell.

Apparatus 300 can include a plurality of members 310. For example, apparatus can include a first member 310a and a second member 310b. The battery cell 120 can be configured to interface with the first member 310a and the second member 310b. For example, the first member 310a can be configured to interface with a first battery cell side 315 of the battery cell 120 and the second member 310b can be configured to interface with a second battery cell side 315 of the battery cell 120. A member side 335 of the first member 310a can interface, either directly or indirectly, with the first battery cell side 315 and a member side 335 of the second member 310b can interface, either directly or indirectly, with the second battery cell side 315. For example, a first element 340 can be disposed between the first member 310a and the first battery cell side 315 and a second element 340 can be dispose between the second member 310b and the second battery cell side 315. The first and second elements 340 can comprise any material with thermal properties configured to facilitate heat transfer between the battery cell 120 and the first and second members 310a, 310b.

Member 310 can define at least one channel 345. The channel 345 can receive a fluid to facilitate thermal control of the battery cell 120 and the overall apparatus 300. For example, the channel 345 can receive a coolant to facilitate heat transfer from the battery cell 120 to the member 310. The fluid can carry the heat away from the battery cell 120. The channel 345 can extend along a member side 335. For example, the channel 345 can be at least partially defined by the member side 335 that interfaces with the battery cell side 315. A channel height 350 can be defined by a height of the member 310. For example, the channel 345 can extend substantially the full height of the member 310. The channel height 350 can also be defined by a height of the battery cell 120. The channel height 350 can be at least as tall as a height of the battery cell 120. For example, the channel height can equal the height of the battery cell or can be greater than the height of the battery cell. The channel height 350 can also be shorter than the height of the batter cell 120. Member 310 can include a plurality of channels 345. For example, a first channel 345 can extend along a first member side 335 and a second channel 345 can extend along a second member side 335. The first channel 345 can be fluidly coupled with the second channel 345 to facilitate fluid flowing from the first channel to the second channel.

Apparatus 300 can include a plurality of members 310. For example, apparatus 300 can include a first member 310a defining a first channel 345 and a second member 310b defining a second channel 345. A member side 335 of the first member 310a can interface with a first battery cell side 315 of a battery cell 120 such that the first channel 345 can facilitate heat transfer between the first member 310a and the first battery cell side 315. A member side 335 of the second member 310b can interface with a second battery cell side 315 of the battery cell 120 such that the second channel 345 can facilitate heat transfer between the second member 310b and the second battery cell side 315. The first member 310a can be disposed parallel with the second member 310b and the first battery cell side 315 can be disposed opposite the second battery cell side 315. For example, the battery cell 120 can be a prismatic battery cell. The first battery cell side 315 of the prismatic battery cell 120 can have a flat surface to interface with a flat surface of the first member 310a and the second battery cell side 315 of the prismatic battery cell 120 can have a flat surface to interface with a flat surface of the second member 310b.

Apparatus 300 can also include a plurality of battery cells 120. For example, apparatus 300 can include a first battery cell 120 and a second battery cell 120. The first battery cell 120 can be configured to interface with a member side 335 of a first member 310a and a first member side 335 of a second member 310b. The second battery cell 120 can be configured to interface with a second member side 335 of the second member 310b. For example, the first member 310a can define a first channel 345 disposed on a member side 335 of the first member 310*a*. The member side 335 of the first member 310*a* can be configured to interface with a first battery cell side 315 of the first battery cell 120. The second member 310*b* can define a second channel 345 and a third channel 345. The second channel 345 can be disposed on a first member side 335 of the second member 310*b* and the third channel 345 can be disposed on a second member side 335 of the second member 310*b*. The first member side 335 can be configured to interface with the second battery cell side 315 of the first battery cell 120 and the second member side 335 can be configured to interface with a battery cell side 315 of the second battery cell 120.

Figure 4:
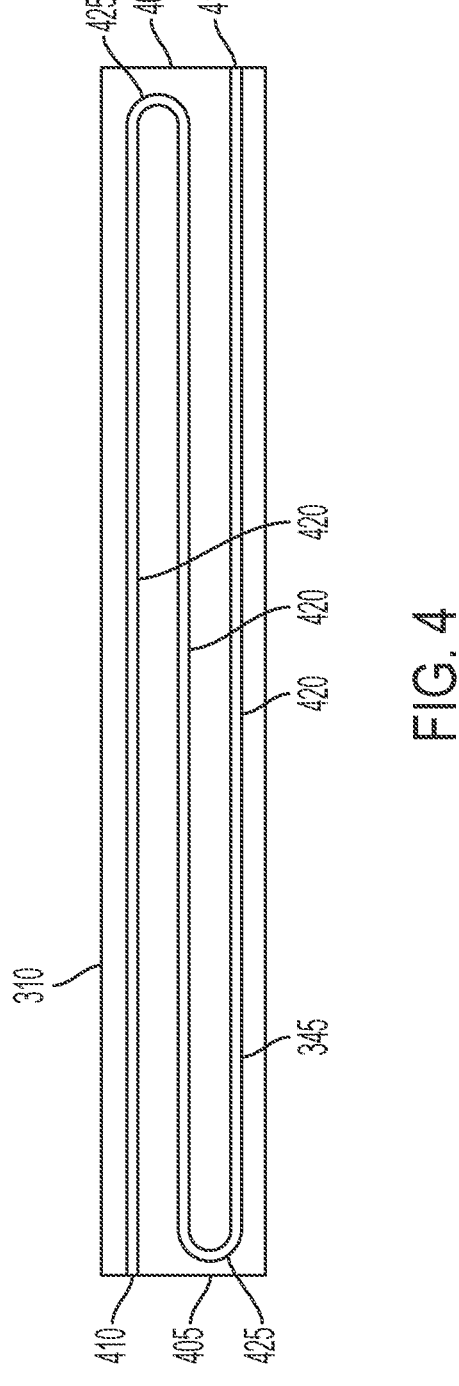
FIG. 4 depicts a cross-sectional view of an example member, in accordance with some aspects.

FIG. 4 depicts side cross-sectional view of an example member 310. Member 310 can include at least one end 405. Member 310 can include at least one inlet 410 and at least one outlet 415. The inlet 410 can be configured to receive a fluid and the outlet can be configured to expel the fluid. For example, a first end 405 of the member 310 can define the inlet 410 and a second end 405 of the member 310 can define the outlet 415. At least one of the first end 405 and the second end 405 can define both the inlet 410 and the outlet 415. The inlet 410 and the outlet 415 can be disposed at other locations of the member 310. For example, the inlet 410 or outlet 415 can be disposed on a top or bottom of the member 310 or on the first member side 335 or the second member side 335. The channel 345 of the member 310 can fluidly couple the inlet 410 with the outlet 415. The channel 345 can have at least one pass 420. A pass 420 can be a path extending between the first end 405 and the second end 405. For example, a channel 345 extending straight along a length of the member 310 from an inlet 410 disposed on a first end 405 to an outlet 415 disposed on a second end 405 can include a single pass. A channel 345 extending along the length of the member 310 a first time from an inlet 410 disposed on a first end 405 and then extending along the length of the member 310 a second time to an outlet 415 disposed on the first end 405 can include a double pass 420 (or two passes 420). A channel 345 extending a first length of the member 310 from the inlet 410 disposed at a first end 405 toward a second end 405, extending a second length of the member 310 back toward the first end 405, and extending a third length of the member 310 back toward the second end 405 to the outlet 415 disposed at the second end can include a triple pass 420 (or three passes 420). For example, the channel 345 can have a serpentine configuration to fluidly couple the inlet 410 with the outlet 415. The number of passes can be defined by the number of longitudinal directional flow changes. For example, if the longitudinal direction of the fluid does not change, the channel 345 can have one pass. If the longitudinal direction of the fluid changes one time, the channel 345 can have two passes. With a plurality of passes 420, a connector region 425 can couple two passes 420 together. For example, a two-pass channel 345 can have a first pass 420 and a second pass 420. The first pass 420 can be coupled with the second pass 420 via the connector region 425. For example, the connector region 425 can be a curved region. The connector region 425 can facilitate fluid transfer between passes 420. Each of the plurality of passes 420 can be the same length or different lengths. For example, each pass 420 can extend an entire length of the member 310 or a first pass can travel part of the length of the member and a second pass can travel the entire length. Each of the plurality of plurality of passes 420 can have the same shape (e.g., straight, sinusoidal, angled, patterned, symmetrical, or asymmetrical, among other shapes) or passes 420 can have different shapes. The channel

345 can be disposed on a member side 335 of the member 310 or the channel 345 can extend between a first member side 335 and a second member side 335 of the member 310. For example, a single channel 345 that extends between the first and second member sides 335 can be configured to receive or provide heat through both member sides 335 of the member 310. The channel 345 can provide thermal control to two separate battery cells 120.

The member 310 can include at least two channels 345. A first channel 345 can be defined, at least partially, by a first member side 335 and a second channel 345 can be defined, at least partially, by a second member side 335. The first channel 345 can be the same as, similar to, or different from the second channel 345. For example, the first channel 345 can fluidly couple a first inlet 410 disposed on a first end 405 of the member 310 with a first outlet 415 disposed on a second end 405 of the member via three passes 420. To be the same, the second channel 345 can fluidly couple a second inlet 410 disposed on a first end 405 with a second outlet 415 disposed on the second end 405 via three passes. The second inlet 410 can be the same as the first inlet 410 and the second outlet 415 can be the same as the first outlet 415 (e.g., the same inlet 410/outlet 415 can serve both channels 345) or they can be distinct. To be different, the second channel 345 can, for example, have one, two, four, etc. passes 420 or have a different shape (e.g., sinusoidal pattern). The first channel 345 and the second channel 345 can be fluidly coupled with the same inlet(s) 410 or different inlet(s) 410 and can be fluidly coupled with the same outlet(s) 415 or different outlet(s) 410.

Figure 5:
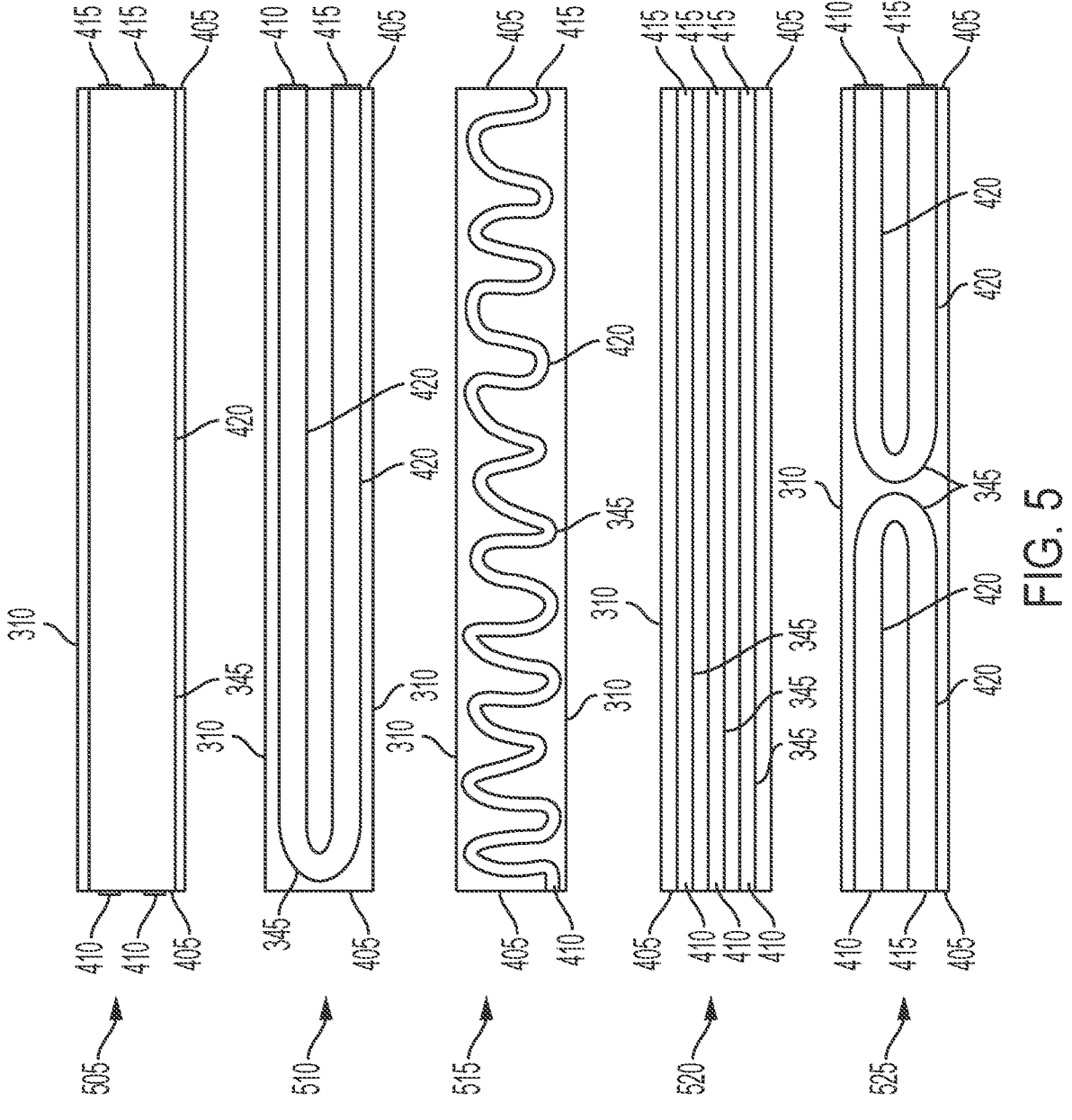
FIG. 5 depicts a plurality of cross-sectional views of example members, in accordance with some aspects.

FIG. 5 depicts a plurality of example configurations of member 310. Configuration 505 can include a member 310 with a channel 345 comprising a single pass 420. The member 310 can include a first inlet 410 and a second inlet 410 disposed at a first end 405 and a first outlet 415 and a second outlet 415 disposed at a second end 405. The channel 345 can extend straight along the length of the member 310 to fluidly couple the first and second inlet 410 with the first and second outlet 415. The height 350 of the channel 345 can be substantially the same height as the member 310 (plus or minus ten percent).

Configuration 510 can include a member 310 with a channel 345 comprising two passes 420. The member 310 can include an inlet 410 disposed on a first end 405 and an outlet 415 disposed on the first end 405. The channel 345 can extend along the length of the member 310 from the inlet toward the second end 405, and extend along the length of the member 310 back toward the first end 405 to the outlet 415 to fluidly couple the inlet 410 with the outlet 415.

Configuration 515 can include a member 310 with a channel 345 comprising a single pass 420. The member 310 can include an inlet 410 disposed on a first end 405 and an outlet 415 disposed on a second end 405. The channel 345 can comprise a sinusoidal configuration. For example, the channel 345 can have a plurality of waves fluctuating between extending toward a top of the member 310 and a bottom of the member 310 as it extends from a first end 405 toward a second end 405. The channel 345 can have any number of waves and the waves can have any height. The member 310 can include an inlet 410 disposed on the first end 405 and an outlet 415 disposed on the second end 405. The sinusoidal channel 345 can fluidly couple the inlet 410 with the outlet 415.

Configuration 520 can include a member 310 with a plurality of channels 345. For example, the member 310 can define a first, second, and third channel 345. The plurality of channels 345 can be disposed on the same member side 335 of the member 310. Member 310 can include a first, second, and third inlet 410 disposed at a first end 405 and a first, second and third outlet 415 disposed at a second end 405. The first channel 345 can fluidly couple the first inlet 410 with the first outlet 415. The second channel 345 can couple the second inlet 410 with the second outlet 415. The third channel 345 can fluidly couple the third inlet 410 with the third outlet 415.

Configuration 525 can include a member 310 with a plurality of channels 345. For example the member can define a first channel 345 and a second channel 345. The first channel 345 and the second channel 345 can be disposed on the same member side 335 of the member 310. Both the first and second channel 345 can have two passes 420. The member 310 can include a first inlet 410 and a first outlet 415 disposed at a first end 405 and a second inlet 410 and a second outlet 415 disposed at a second end 405. Each channel 345 can extend partially along the length of the member 310. For example, the first channel 345 can extend substantially halfway (plus or minus ten percent) along the length of the member 310 from the first end 405 toward a center of the member 310 and the second channel 345 can extend substantially halfway along the length of the member 310 from the second end 405 toward the center.

Configurations 505-525 show a plurality of examples of various configurations of channels 345. The examples shown can be altered to accommodate any number of channels 345, any number of passes 420, any shape or orientation of the channels 345 (e.g., diagonal, straight, sinusoidal, etc.), any length of channels 345, any height of channels, any number of inlets 410 and outlets 415, any location of inlets 410 and outlets 415, and any other variation. For example, configuration 505 can include any number of inlets 410 and outlets 415, configuration 510 can include any number of passes 420 to create a serpentine configuration, configuration 515 can have more or less waves, configuration 520 can include any number of channels 345 and all of the channels 345 can be coupled with a single inlet 410 and a single outlet 415, and configuration 525 can include a first channel 345 that extends over halfway along the length of the member 310 and a second channel 345 that extends less than halfway along the length of the member 310.

A member 310 can include a first channel 345 disposed on a first member side 335 of the member 310 and a second channel 345 disposed on a second member side 335 of the member 310. The first channel 345 and the second channel 345 can be the same or can be different. For example, both the first and the second channel 345 can have configuration 510. In another example, the first channel 345 can have configuration 510 with a first inlet 410 and a first outlet 415 on a first end 405 of the member 310 and the second channel 345 can have configuration 510 but with a second inlet 410 and a second outlet 415 on a second end 405 of the member 310. In another example, the first channel 345 can have configuration 510 and the second channel 345 can have configuration 515. Any combination of configurations can be defined by a single member 310.

The apparatus 300 can include any variety of members 310. For example, apparatus 300 can include a first member 310*a* and a second member 310*b*. The first member 310*a* can include a first inlet 410, a first outlet 415, and a first channel 345 to fluidly couple the first inlet 410 with the first outlet 415. The first channel 345 can have a single pass 420 extending a length of the first member 310*a*. The second member 310*b* can include a second inlet 410, a second outlet 415, and a second channel 345 to fluidly couple the second inlet 410 with the second outlet 415. The second channel 345 can also have a single pass 420 extending a length of the second member 310*b*. Alternatively, the first channel 345 can have a plurality of passes extending along the length of the first member 310*a*, the second channel 345 can have a plurality of passes extending along the length of the second member 310*b*, or both the first and second channels 345 can have a plurality of passes. The number of passes of the first channel 345 can be different than the number of passes of the second channel 345.

The inlets 410 and the outlets 415 of a channel 345 can be interchangeable. For example, with reference to configuration 510, inlet 410 and outlet 415 can be disposed on a first end 405 of the member 310. In a first mode of operation with configuration 510, the top pass 420 can receive fluid through inlet 410, the fluid can flow from the first end 405 toward the second end 405 via the top pass 420, and then the fluid can return toward the first end 405 via the bottom pass 420 and exit the channel 345 via the outlet 415. In a second mode of operation, the inlet 410 and the outlet 415 can effectively switch such that the bottom pass 420 can receive fluid through inlet 410 (which is below the outlet 415 in the second mode of operation), the fluid can flow from the first end 405 toward the second end 405 via the bottom pass 420, and then the fluid can return toward the first end 405 via the top pass 420 and exit the channel 345 via the outlet 415 (which is above the inlet 410 in the second mode of operation). Any channel 345 can accommodate fluid flow in any direction and any inlet 410 can function as an outlet 415 and any outlet 415 can function as an inlet 410.

Figure 6:
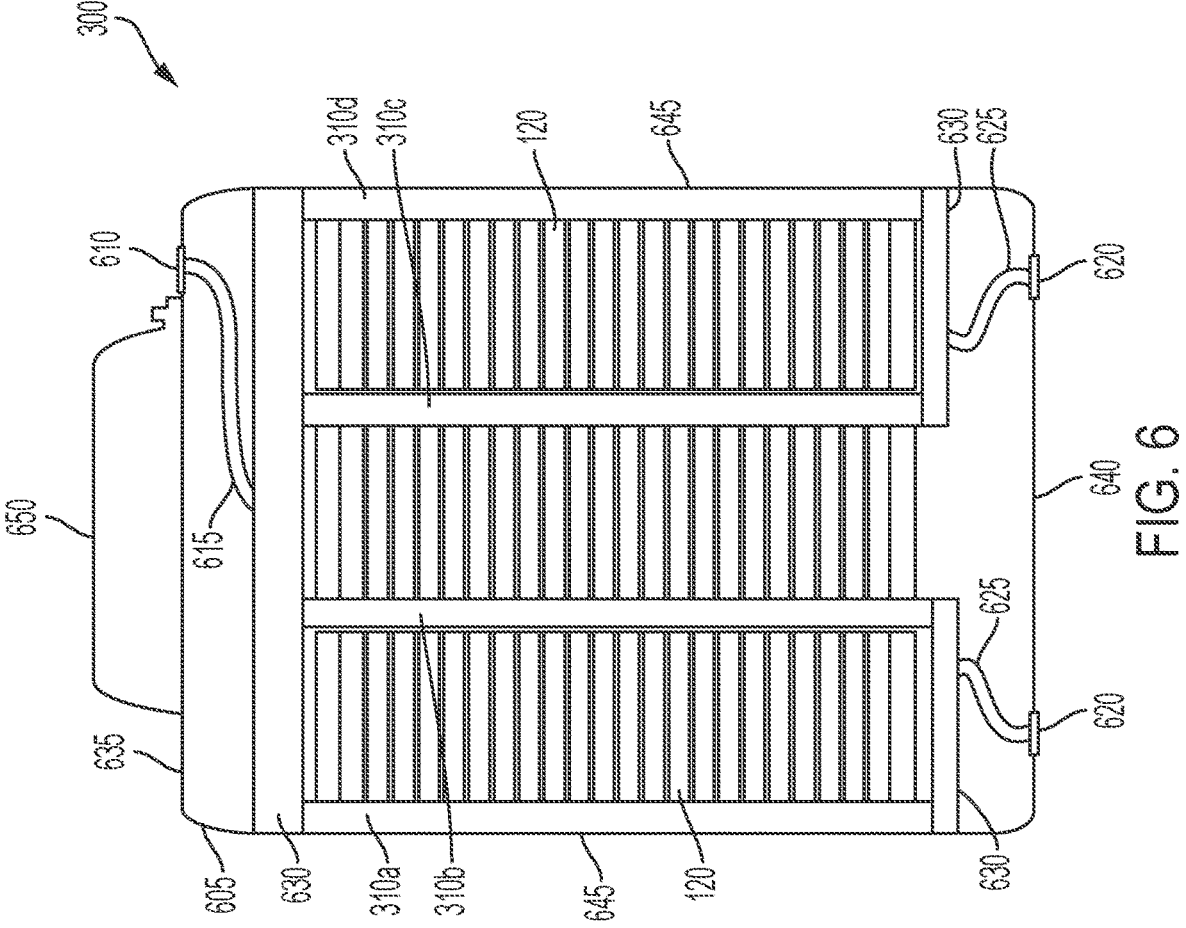
FIG. 6 depicts a top view of an example apparatus, in accordance with some aspects.

FIG. 6 depicts an example apparatus 300. Apparatus 300 can be or can include at least one battery pack 110. The battery pack 110 can be for an electric vehicle 105. For example, apparatus 300 can include a housing 605, at least one battery cell 120, and at least one member 310. The housing 605 can be or can include housing 205. The housing 605 can define at least a part of an outer shell of the apparatus 300. For example, the housing 605 can include a front end 635, a rear end 640, a first sidewall 645, and a second sidewall 645. The housing 605 can include a header 650. For example, the front end 635 can be or can include the header 650. The header 650 can contain, for example, other components of the battery pack 110. The battery cell 120 can be disposed within the housing 605. The member 310 can be disposed within the housing 605 or can be a part of the housing 605. For example, the member 310 can be disposed within the housing 605 such that the housing 605 defines an outer shell that surrounds the member 310. The member 310 can be any part of the housing 605. For example, the member 310 can be a sidewall 645 of the housing 605. The member 310 can include fins, or other projections, that extend from a member side 335. For example, the member side 335 acting as the external wall of the housing 605 (e.g., the member side 335 not interfacing with a battery cell 120) can include fins. The fins can increase impact protection. The fins can also facilitate heat dissipation from the member 310.

The housing 605 can include at least one fluid inlet 610. The fluid inlet 610 can receive a fluid from a fluid source such that the fluid can reach a channel 345 of a member 310. The fluid inlet 610 can be disposed anywhere on the housing 605. For example, the fluid inlet 610 can be disposed at the front end 635 of the apparatus 300, on a sidewall 645, at the rear end 640, or on any other side of the housing 605 (e.g., top or bottom). The fluid inlet 610 can be directly coupled with an inlet 410 of the member 310 or the fluid inlet 610 cannot be directly coupled with the inlet 410 of the member 310. For example, the apparatus 300 can include at least one supply conduit 615. The supply conduit 615 can provide a path for the fluid to reach the channel 345 of the member 310. The supply conduit 615 can couple with the inlet 410 of the member 310 or to other components configured to provide the fluid to the member 310 (e.g., the manifold 630 described in more detail below). The housing 605 can also include at least one fluid outlet 620. The fluid outlet 620 can receive the fluid from the channel 345 of the member 310. The fluid outlet 620 can be disposed anywhere on the housing 605. For example, the fluid outlet 620 can be disposed at the front end 635 of the apparatus 300, on a sidewall 645, at the rear end 640, or on any other side of the housing 605 (e.g., top or bottom). The fluid outlet 620 can be directly coupled with an outlet 415 of the member 310 or the fluid outlet 620 cannot be directly coupled with the outlet 415 of the member 310. For example, the apparatus 300 can include at least one return conduit 625. The return conduit 625 can provide a path for the fluid to reach the fluid outlet 620 from the member 310. The return conduit 625 can couple with the outlet 415 of the member 310 or to other components configured to receive the fluid from the member 310. Similar to the inlet 410 and the outlet 415 of a member 310, the fluid inlet 610 and the supply conduit 615 can be interchangeable with the fluid outlet 620 and the return conduit 625. For example, fluid can be supplied to the apparatus 300 via the fluid outlet 620 such that the fluid outlet 620 acts as a fluid inlet 610 and receives the fluid, the return conduit 625 can act as the supply conduit 615 and provide the fluid to the channels 345 of the members 310, the fluid can flow through the channels to the supply conduit 615 which can act as the return conduit 625 and receive the fluid from the members to the fluid inlet 610, which can act as the fluid outlet 620 and discharge the fluid from the apparatus 300.

Apparatus 300 can include a plurality of members 310. For example, apparatus can include first member 310a, second member 310b, third member 310c, and fourth member 310d. Apparatus 300 can include any number of members 310. The battery cell 120 can be disposed between the plurality of members 310. For example, the battery cell 120 can be a prismatic battery cell 120. The first member 310a can interface with a first battery cell side 315a and the second member 310b can interface with a second battery cell side 315b. The first battery cell side 315a and the second battery cell side 315b can be on opposite sides of the battery cell 120. The plurality of members 310 can be disposed parallel (within 10%) with each other. For example, the first battery cell side 315a can be parallel with the second battery cell side 315b such that the first member 310a, when interfacing with the first battery cell side 315a, can be parallel with the second member 310b, when interfacing with the second battery cell side 316b.

The members 310 can extend from a front end 635 to a rear end 640 of the apparatus 300. The members 310 can extend from a first sidewall 645 to a second sidewall 645 of the apparatus 300. The members 310 can extend a full distance of the apparatus 300 or a partial distance. The plurality of members 310 can also be disposed at different angles. For example, a first member can be perpendicular to a second member. For example, a battery cell 120 can be a prismatic battery cell. The first member 310 can interface with a first side of the prismatic battery cell and the second member 310 can interface with a second side of the prismatic battery cell, the second side being adjacent to the first side. Members 310a-d can all be the same. For example, each member 310a-d can include the same number of channels 345, same external physical structures, etc. regardless of location or role within the apparatus 300. Members 310a-d can all be different or some can be different and some can be the same. For example, second member 310b and third member 310c can be the same since both include a first member side 335 interfacing with a battery cell side 315 of a first battery cell 120 and a second member side 335 interfacing with a battery cell side 315 of a second battery cell 120. Both the second and third member 310b-c can include two channels 345. A first channels 345 can be defined by the first member sides 335 and the second channels 345 can be defined by the second member sides 335. The first member 310a and the fourth member 310d can be similar with each defining a single channel 345, but defined by opposite member sides 335. With respect to FIG. 6, the channels 345 of the first and fourth members 310a,d can be defined by an internal member side 335 (e.g., the right member side 335 for member 310a and the left member side 335 for member 310d). Members 310a,d can be a part of the housing 605 and define an exterior of the apparatus 300. Members 310a,d can include fins or other projections on the external member sides 335 to increase impact protection and heat dissipation.

The apparatus 300 can include at least one manifold 630. The manifold 630 can be disposed in the housing 605. The manifold can be a part of the housing 605. For example, the header 650 can be or can include the manifold 650 or the manifold 630 can be any side of the housing 605 (e.g., a rear end 640). The manifold 630 can fluidly couple with any number of members 310 and any number of channels 345. For example, the manifold can fluidly couple with a first member 310 and a second member 310. The manifold can fluidly couple a first channel 345 of a member 310 and with a second channel 345 of the member 310. The manifold 630 can be a rigid structure or can be a flexible structure (e.g., flexible tubing), or a combination thereof. The manifold 630 can be configured to provide fluid to, collect fluid from, or transfer fluid between a plurality of members 310 or a plurality of channels 345. For example, the manifold 630 can be configured to distribute fluid to a first channel 345 of the first member 310a and a second channel 345 of the second member 310b. The manifold 630 can include at least one inlet to receive the fluid and at least one outlet to provide the fluid to the first channel 345 and the second channel 345. The inlet of the manifold 630 can be directly coupled with a fluid inlet 610 of the housing 605. For example, a portion of the manifold 630 can abut a sidewall 645 of the housing 605. The fluid inlet 610 can be disposed at the location of the sidewall 645 where the manifold 630 abuts the sidewall 645. The inlet of the manifold 630 can be coupled with the fluid inlet 610 of the housing 605 via a supply conduit 615. The outlet of the manifold 630 can be directly coupled with a fluid outlet 620 of the housing 605. For example, a portion of the manifold 630 can abut a sidewall 645 of the housing 605. The fluid outlet 620 can be disposed at the location of the sidewall 645 where the manifold 630 abuts the sidewall 645. The outlet of the manifold 630 can be coupled with the fluid outlet 620 via a return conduit 625. The manifold 630 can define a volume for fluid to travel freely through or can include pathways for the fluid to follow. For example, manifold 630 can be or can include a single reservoir coupled with the channels 345 of each member 310a-d. The manifold 630 can be or can include a plurality of passages to guide fluid from a particular location to a particular destination. For example, manifold 630 can fluidly couple with members 310a-d. The manifold 630 can receive fluid from a single source and distribute the fluid to each of the members 310a-d. The manifold 630 can be directly coupled with a fluid inlet 610 or can receive the fluid via a supply conduit 615. The manifold 630 can also receive fluid from a plurality of sources (e.g., multiple fluid inlets 610, multiple supply conduits 615, or any combination thereof).

The manifold 630 can also fluidly couple a first member 310 with a second member 310. For example, the first member 310a can define a first channel 345 and the second member 310b can define a second channel 345. The first member 310 can have a first inlet 410 and a first outlet 415. The second member can have a second inlet 410 and a second outlet 415. The manifold 630 can extend between the first outlet 415 and the second inlet 410 to fluidly couple the first channel 345 of the first member 310 with the second channel 345 of the second member 310. The manifold 630 can provide a path for fluid to flow from a channel 345 of the first member 310 to a channel 345 of the second member 310. The manifold 630 can facilitate fluid transfer from the first inlet 410 to the second outlet 415

The apparatus 300 can include a plurality of manifolds 630. For example, a first manifold 630 can fluidly couple a first set of members 310 and a second manifold 630 an fluidly couple a second set of members 310. For example, the first manifold 630 can couple member 310a with member 310b. Fluid can flow through a channel 345 defined by member 310a and transfer from the channel 345 of member 310a to channel 345 of member 310b via the manifold 630. The second manifold 630 can couple members 310c with member 310d. Fluid can flow through a channel 345 defined by member 310d and transfer from the channel 345 of member 310d to channel 345 of member 310c via the manifold 630. The apparatus 300 can include a third manifold 630 to couple member 310b with 310c. The third manifold 630 can receive the fluid that flows through channel 345 of member 310b and the channel 345 of member 310c. The third manifold 630 can direct the fluid to a fluid outlet 620 of the housing 605, either directly or via a return conduit 625.

The apparatus 300 can also include a plurality of manifolds 630 coupled with a plurality of channels 345. For example, the apparatus 300 can include a first manifold 630 and a second manifold 630. The first manifold 630 can be configured to provide a fluid to the first channel 345 and the second channel 345. The second manifold 630 can be configured to receive the fluid from the first channel 345 and the second channel 345. For example, the first and second manifolds 630 can be disposed on opposing ends of the battery apparatus 300.

The manifold 630 can fluidly couple any number of channels 345. For example, a member 310 can define a first channel 345 and a second channel 345. The manifold 630 can couple the first channel 345 with the second channel 345. For example, fluid can flow along a first member side 335 of a member 310 via the first channel 345, flow through the manifold 630 from the first channel 345 to the second channel 345, and flow along a second member side 335 of the member 310 via the second channel 345. The manifold 630 can be disposed within or be integrated with the member 310. The manifold 630 can also be external and distinct from the member 310.

The apparatus can include a plurality of battery cells 120. The plurality of battery cells 120 can be disposed between a first member 310 and a second member 310. For example, the plurality of battery cells 120 can be disposed between first member 310a and second member 310b. The first member 310a can include a member side 335 and the second member 310b can include a member side 335. Each of the plurality of battery cells 120 can have a first battery cell side 315 and a second battery cell side 315. The first battery cell side 315 of each of the plurality of battery cells 120 can be configured to interface with the member side 335 of the first member 310a. The second battery cell side 315 of each of the plurality of battery cells 120 can be configured to interface with the member side 335 of the second member 310b. The first member 310a can define a first channel 345 and the second member 310b can define a second channel 345. The first channel 345 can be configured to facilitate heat transfer with the first battery cell side 315 of each of the plurality of battery cells 120 and the second channel 345 can be configured to facilitate heat transfer with the second battery cell side 315 of each of the plurality of battery cells 120.

The plurality of battery cells 120 can be disposed between different members 310 of the apparatus 300. For example, a first battery cell 120 can be disposed between the first member 310a and the second member 310b and a second battery cell 120 can be disposed between the second member 310b and a third member 310c. First member 310a can define a first channel 345, the first channel disposed on a member side 335 of the first member 310a. Second member 310b can define a second channel 345 and a third channel 345, the second channel 345 disposed on a first member side 335 of the second member 310b and the third channel 345 disposed on a second member side 335 of the second member 310b. Third member 310c can define a fourth channel 345, the fourth channel disposed on a member side 335 of the third member 310c. The member side 335 of the first member 310a can interface with a first battery cell side 315 of the first battery cell 120. The interfacing can thermally couple the first channel 345 with the first battery cell 120. The first member side 335 of the second member 310b can interface with a second battery cell side 315 of the first battery cell 120. The interfacing can thermally couple the second channel 345 with the first battery cell 120. The second member side 335 of the second member 310b can interface with a first battery cell side 315 of the second battery cell 120. The interfacing can thermally couple the third channel 345 with the second battery cell 120. The member side 335 of the third member 310c can interface with a second battery cell side 315 of the second battery cell 120. The interfacing can thermally couple the fourth channel 345 with the second battery cell 120.

The plurality of members 310 can define a plurality of rows of battery cells 120. For example, the first member 310a can be parallel with the second member 310b, which can be parallel with the third member 310c, which can be parallel with the fourth member 310d. A set of battery cells 120 can be disposed between two adjacent members 310. For example, a first set of battery cells 120 can be disposed between the first member 310a and the second member 310b, a second set of battery cells can be disposed between the second member 310b and the third member 310c, and a third set of battery cells can be disposed between the third member 310c and the fourth member 310d. Each of the plurality of battery cells 120 can interface with the respective members 310a-d to thermally couple with the channels of said respective members 310a-d. The plurality of rows of battery cells 120 can also be oriented at different angles. For example, the first member 310a and the second member 310b can extend longitudinally along the apparatus 300 defining a longitudinal section for a first set of battery cells 120. The third member 310c and the fourth member 310d can extend laterally across the apparatus 300 defining a lateral section for a second set of battery cells 120.

Figure 7:
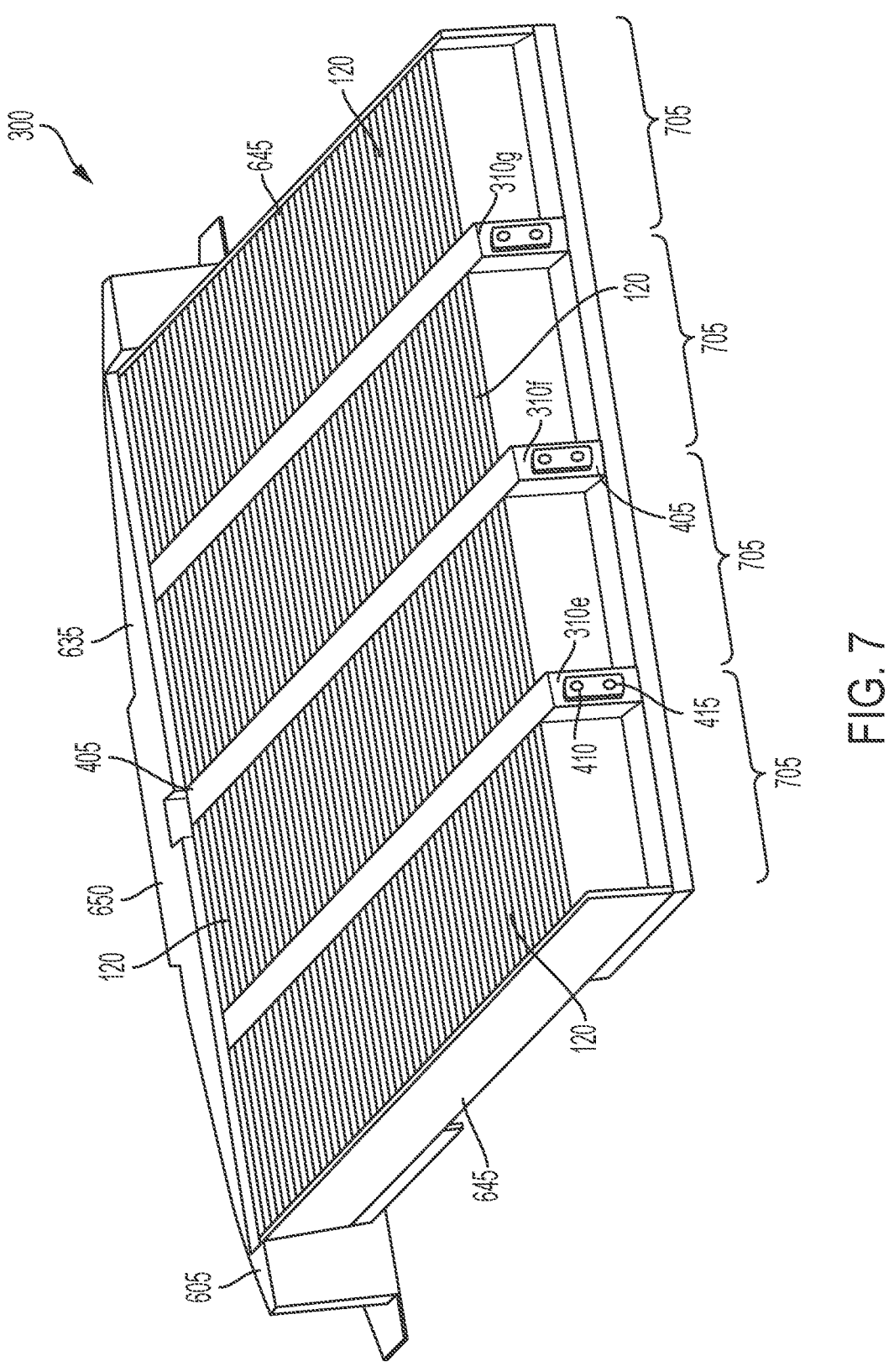
FIG. 7 depicts a perspective view of an example apparatus, in accordance with some aspects.

FIG. 7 depicts a perspective view of an example apparatus 300. Apparatus 300 can be or can include a battery pack. Apparatus 300 can include a housing 605, at least one battery cell 120, and at least one member 310. The housing 605 can define at least a part of an outer shell of the apparatus 300. For example, the housing 605 can include a front end 635, a rear end 640, a first sidewall 645 and a second sidewall 645. The front end 635 can be or can include a header 650. The header 650 can be or include a manifold 630. For example, the header 650 can define a space configured to receive fluid and distribute the fluid to the member 310. The housing 605 can be a complete shell such that the battery cell 120 and the member 310 can be disposed within the housing 605. The housing 605 can also be a partial shell. For example, member 310 can be a part of the housing 605. For example, member 310 can be a sidewall 645 of the housing 605. The member 310 can be any portion of the housing 605. A plurality of members 310 can also define the housing 605. For example, several sides of the housing 604 can be a member 310. Apparatus 300 can include a plurality of members 310. The plurality of members 310 can include a first member 310e, a second member 310f, and a third member 310g. Members 310e-g can all be disposed within the housing 605. The apparatus 300 can include other members that can act as a sidewall 645 of the housing 605. For example, a fourth and a fifth member 310 can be a first sidewall 645 and a second sidewall 645 of the housing 605. A member 310 can also be a front end 635 or rear a rear end 640 of the housing 605. Members 310 can have additional features to support, protect, or thermally control the apparatus 300. For example, members 310 can have fins that extend from a member side 335. The fins can provide impact resistance. The fins can facilitate additional heat dissipation. Any of the members 310 can provide structure and support to the apparatus 300 as well as thermal control to the apparatus 300.

The plurality of members 310 can be oriented to provide thermal control to the apparatus 300. For example, the plurality of members 310 can be configured in any combination of orientations such that a first battery cell side 315 of the battery cell 120 can interface with a first member 310 and a second battery cell side 315 of the battery cell 120 can interface with a second member 310. The plurality of members 310 can extend longitudinally along the apparatus 300. The plurality of members 310 can extend the full length of the apparatus 300 or a portion of the length. The plurality of members 310 can extend in other directions with respect to the apparatus 300. For example, the plurality of members 310 can extend laterally or diagonally across the apparatus 300. Each of the plurality of members 310 can have the same orientation or different orientations. For example, member 310f can extend longitudinally and member 310g can extend laterally. The plurality of members 310 can extend in any combination of orientations.

As discussed in more detail above, the members 310 can include at least one channel 345 configured to thermally couple with the battery cell 120. The channel 345 can be configured to provide a path for a fluid to flow through the member 310 and receive heat from or provide heat to the battery cell 120 to thermally control the battery cell 120 and the apparatus 300 as a whole. For example, the channel 345 can control a temperature of the battery cell 120. If a member 310 is to interface with two battery cells 120, the member 310 can have a first channel 345 disposed on a first member side 335 of the member 310 and a second channel 345 disposed on a second member side 335 of the member 310. The member 310 can also have one channel 345 that extends between the first member side 335 and the second member side 335. The inlet(s) 410 and the outlet(s) 415 for the channel(s) 345 can be disposed at any location on the member 310. The apparatus 300 can include a manifold to fluidly couple any of the channels 345 together, whether the channels 345 are disposed in different members 310 or the same member 310.

The battery cell 120 can be configured to interface with at least two members 310. For example, a first battery cell side 315 can be configured to interface with a member side 335 of a first member 310e and a second battery cell side 315 can be configured to interface with a member side 335 of a second member 310f. The first battery cell side 315 and the second battery cell side 315 can be opposing sides of a prismatic battery cell 120 such that the first member 310e can be parallel with the second member 310f. The first battery cell side 315 and the second battery cell side 315 can be adjacent sides of the prismatic battery cell 120 such that the first member 310e can be perpendicular with the second member 310f. The first member 310e and the second member 310f can be oriented at any angle with respect to each other. The orientation of the first member 310e and the second member 310f can be based on the angles of the battery cell sides 315.

The apparatus 300 can include a plurality of battery cells 120. The plurality of members 310 can define at least one bay 705 for the plurality of battery cells 120. For example, a first member 310 and a second member 310 can define a bay 705. The first member 310 can be member 310e and the second member 310 can be member 310f. The first member 310e can run longitudinally along the apparatus 300. The second member 310f can run parallel with first member 310e. A space between the first member 310e and the second member 310f can be the bay 705. The plurality of battery cells 120 can be disposed in the bay 705. A first battery cell side 315 of each of the plurality of battery cells 120 can be configured to interface with a member side 335 of the first member 310e and a second battery cell side 315 of each of the plurality of battery cells 120 can be configured to interface with a member side 335 of the second member 310f.

The plurality of members 310 can define a plurality of bays 705 (e.g., compartments, slots). For example, the members 310 can act as walls (internal or external) of the apparatus 300. For example, a first sidewall 645 of the apparatus 300 and a first member 310e can define a first bay 705, the first member 310e and the second member 310f can define a second bay 705, the second member 310f and the third member 310g can define a third bay 705, and the third member and a second sidewall 645 of the apparatus 300 can define a fourth bay 705. When the sidewalls 645 of the apparatus 300 are members 310, a fourth member 310 and the first member 310e can define the first bay 705 and a fifth member 310 and the third member 310g can define the fourth bay. The plurality of bays 705 can be uniform (e.g., same size, extend in the same direction) or can have varying shapes, sizes, and orientations. For example, the first, second, and third members 310e-g can extend parallel (plus or minus 10%) with the first and second sidewalls 645 of the housing 605 such that the first, second, third, and fourth bays 705 can extend from a front end 635 of the housing 605 to a rear end 640 of the housing 605. In another example, the first member 310e can extend parallel (plus or minus 10%) with the first sidewall 645 and the second and third members 310f,g can extend parallel (plus or minus 10%) with the front end 635 (e.g., perpendicular to the first member 310e). The first bay 705 can be defined by the first sidewall 645 and the first member 310*e* and extend from a front end 635 to a rear end 640 of the housing 605. A second bay 705 can be defined by the front end 635 and the second member 310*f* and extend from the first member 310*e* to the second sidewall 645. A third bay 705 can be defined by the second member 310*f* and the third member 310*g* and extend from the first member 310*e* to the second sidewall 645. A fourth bay 707 can be defined by the third member 310*g* and the rear end 640 of the housing 605 and extend from the first member 310*e* to the second sidewall 645. The widths and lengths of the bays 705 can be based on the size and number of the battery cells 120.

Each of the members 310 can have at least one channel 345. For example, a member 310 can have a channel 345 disposed on a member side 335 of the member 310. The member side 335 can be configured to interface with a battery cell 120. For example, the first member 310*e* can include a channel 345 disposed on a member side 335 of the first member 310*e*. The member side 335 of the first member 310*e* can be configured to interface with a first battery cell 120 disposed in the first bay 705. The channel 345 can thermally couple with a first battery cell side 315 of the first battery cell 120. In another example, a member 310 can have a channel 345 that extends between a first member side 335 and a second member side 335 of the member 310 to thermally couple with the first battery cell 120 configured to interface with the first member side 335 and a second battery cell 120 configured to interface with the second member side 335. For example, the first member 310*e* can include a channel 345. The channel 345 can extend between a first member side 335 and a second member side 335 of the first member 310*e*. The first member side 335 can interface with the battery cell side 315 of the first battery cell 120 and the second member side 335 can interface with a first battery cell side 315 of a second battery cell 120. The channel 345 can thermally couple with both the first battery cell 120 and the second battery cell 120.

A member 310 can also have a plurality of channels 345. For example, the member 310 can have a first channel 345 disposed on a first member side 335 of the member 310 and a second channel 345 disposed on a second member side 335 of the member 310. For example, the first member 310*e* can have a first channel 345 disposed on the first member side 335 of the first member 310*e* and a second channel 345 disposed on the second member side 335 of the first member 310*e*. The first member side 335 of the first member 310*e* can interface with the battery cell side 315 of the first battery cell 120 and the second member side 335 of the first member 310*e* can interface with a first battery cell side of the second battery cell 120. The first channel 345 of the first member 310*e* can thermally couple with the first battery cell 120 and the second channel 345 of the first member 310*e* can thermally couple with the second battery cell 120.

A subset of the plurality of battery cells 120 can be disposed in each of the bays 705. For example, a first subset can be disposed in the first bay 705, a second subset can be disposed in the second bay 705, a third subset can be disposed in the third bay 705, and a fourth subset can be disposed in the fourth bay 705. A first battery cell side 315 of each of the battery cells 120 of the first subset can interface with the first sidewall 645 of the housing 605 (or a member 310 when the member 310 is the sidewall 645) and a second battery cell side 315 of each of the battery cells 120 of the first subset can interface with the first member 310*e*. A channel 345 of the first member 310*e* can be thermally coupled with each of the battery cells 120 of the first subset. A first battery cell side 315 of each of the battery cells 120 of the second subset can interface with the first member 310*e* and a second battery cell side 315 of each of the battery cells 120 of the second subset can interface with the second member 310*f*. A channel 345 of the first member 310*e* and a channel 345 of the second member 310*f* can be thermally coupled with each of the battery cells 120 of the second subset. A first battery cell side 315 of each of the battery cells 120 of the third subset can interface with the second member 310*f* and a second battery cell side 315 of each of the battery cells 120 of the third subset can interface with the third member 310*g*. A channel 345 of the second member 310*f* and a channel 345 of the third member 310*g* can be thermally coupled with each of the battery cells 120 of the third subset. A first battery cell side 315 of each of the battery cells 120 of the fourth subset can interface with the third member 310*g* and a second battery cell side 315 of each of the battery cells 120 of the fourth subset can interface with the second sidewall 645 of the housing 605 (or a member 310 when the member 310 is the second sidewall 645). A channel 345 of the third member 310*g* can be thermally coupled with each of the battery cells 120 of the fourth subset.

Figure 8:
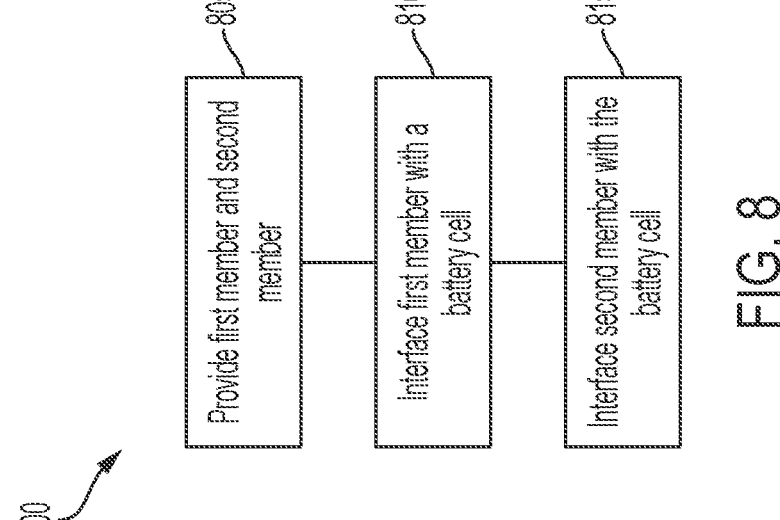
FIG. 8 depicts a flow diagram illustrating an example method to assemble an example apparatus, in accordance with some aspects.

FIG. 8 depicts an example method 800 to assemble an apparatus 300. Method 800 can include providing a first member and a second member (Act 805), interfacing the first member with a battery cell (Act 810), and interfacing the second member with the battery cell (Act 815). Act 805 can include providing a first member 310 and a second member 310. The first member 310 and the second member 310 can be any of members 310*a*-310*g*, or any variation thereof. The first and second members 310 can be structural components of the apparatus 300. For example, the members 310 can be internal or external walls of the apparatus 300. The first and second members 310 can define a bay 705 to receive a battery cell 120. The first member 310 can be parallel with the second member 310. The first member 310 can define at least one channel 345 and the second member 310 can define at least one channel 345. For example, the first member 310 can define a first channel 345 and the second member 310 can define a second channel 345. The first and second channels 345 can be configured to thermally couple with a battery cell 120. As described in more detail with respect to FIG. 5, among others, the first channel 345 can have any configuration. The second channel 345 can have the same configuration as the first channel 345 or a different configuration. The members 310 can include at least one inlet 410 and at least one outlet 415. For example, the first member 310 can define a first inlet 410 and a first outlet 415. The second member 310 can define a second inlet 410 and a second outlet 415.

Providing the first and second member 310 can include fluidly connecting the first and second members 310. For example, act 805 can include connecting the first channel 345 with the second channel 345 via a manifold 630. The manifold 630 can extend from the first outlet 415 of the first member 310 to the second inlet 410 of the second member 310. For example, the manifold 630 can facilitate fluid transfer from the first channel 345 to the second channel 345. The manifold 630 can also extend between the first inlet 410 and the second inlet 410. For example, the manifold 630 can provide fluid to both the first channel 345 and the second channel 345. The manifold 630 can also extend between the first outlet 415 and the second outlet 415. For example, the manifold 630 can receive fluid from both the first channel 345 and the second channel 345.

Act 810 can include interfacing the first member 310 with the battery cell 120. The first member 310 can have a member side 335 configured to interface with a first battery cell side 315 of the battery cell 120. A geometry of the member side 335 can correspond with a geometry of the first battery cell side 315. For example, the member side 335 can have a planar surface configured to interface with a planar surface of the first battery cell side 315. Interfacing the first member 310 with the battery cell 120 can thermally couple the first channel 345 with the battery cell 120. The first channel 345 can facilitate thermal control of the battery cell 120 by receiving heat from or providing heat to the battery cell 120 via the member side 335 of the first member 310.

Interfacing the first member 310 with the battery cell 120 can include inserting an element 340 between the first member 310 and the battery cell 120. The element 340 can be any material configured to facilitate heat transfer. The element 340 can ensure a proper interfacing between the member side 335 of the first member 310 and the first battery cell side 315. For example, if the geometry of the member side 335 does not correspond with the geometry of the first battery cell side 315 or if there is some space between the member side 335 and the first battery cell side 315, the element 340 can fill the open spaces. With the element 340 inserted, at least a portion of the first battery cell side 315 can be indirectly interfacing with the member side 335 of the first member 310.

Act 815 can include interfacing the second member 310 with the battery cell 120. The second member 310 can have a member side 335 configured to interface with a second battery cell side 315 of the battery cell 120. A geometry of the member side 335 can correspond with a geometry of the second battery cell side 315. For example, the member side 335 can have a planar surface configured to interface with a planar surface of the second battery cell side 315. Interfacing the second member 310 with the battery cell 120 can thermally couple the second channel 345 with the battery cell 120. The second channel 345 can facilitate thermal control of the battery cell 120 by receiving heat from or providing heat to the battery cell 120 via the member side 335 of the second member 310.

Interfacing the second member 310 with the battery cell 120 can include inserting an element 340 between the second member 310 and the battery cell 120. The element 340 can be any material configured to facilitate heat transfer. The element 340 can ensure a proper interfacing between the member side 335 of the second member 310 and the second battery cell side 315. For example, if the geometry of the member side 335 does not correspond with the geometry of the second battery cell side 315 or if there is some space between the member side 335 and the second battery cell side 315, the element 340 can fill the open spaces. With the element 340 inserted, at least a portion of the second battery cell side 315 can be indirectly interfacing with the member side 335 of the second member 310.

Method 800 can include providing any number of members 310 with any number of channels and interfacing any number of battery cells 120 with the members 310. For example, as shown in FIG. 6, among others, the apparatus 300 can include four members 310a-d and three subsets of battery cells 120. The battery cells 120 of a first subset can interface with the first member 310a and the second member 310b. The battery cells 120 of a second subset can interface with the second member 310b and the third member 310c. The battery cells 120 of a third subset can interface with the third member 310c and the fourth member 310d. The members 310a-d can have at least one channel 345. At least one manifold 630 can fluidly couple any number of channels 345.

Figure 9:
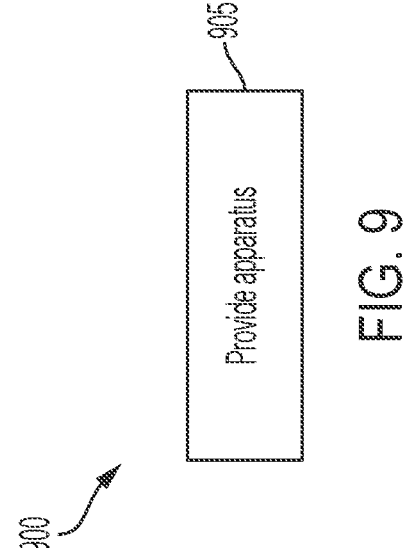
FIG. 9 depicts a flow diagram illustrating an example method to provide an example apparatus, in accordance with some aspects.

FIG. 9 depicts an example method 900 to provide an apparatus 300. Method 900 can include providing the apparatus (Act 905). The apparatus 300 can include at least a first member 310, a second member 310, and a battery cell 120. The first member 310 can define a first channel 345 and the second member 310 can define a second channel 345. As described in more detail above with respect to FIGS. 4 and 5, among others, the first and second channels 345 can have any configuration. The first and second members 310 can interface with a battery cell side 315 of the battery cell 120. For example, the first member 310 can have a member side 335. The member side 335 of the first member 310 can interface with a first battery cell side 315 of the battery cell 120. The second member 310 can have a member side 335. The member side 335 of the second member 310 can interface with a second battery cell side 315 of the battery cell 120. The apparatus 300 can include at least one element 340. The element 340 can be disposed between the battery cell 120 and at least one of the first or second members 310.

The apparatus 300 can include at least one manifold 630. The first member 310 can include a first inlet 410, a first outlet 415, and a first channel 345 fluidly coupling the first inlet 410 with the first outlet 415. The second member 310 can include a second inlet 410, a second outlet 415, and a second channel 345 fluidly coupling the second inlet 410 with the second outlet 415. The manifold 630 can extend from the first outlet 415 of the first member 310 to the second inlet 410 of the second member 310. For example, the manifold 630 can facilitate fluid transfer from the first channel 345 to the second channel 345. The manifold 630 can extend between the first inlet 410 and the second inlet 410. For example, the manifold 630 can provide fluid to both the first channel 345 and the second channel 345. The manifold 630 can extend between the first outlet 415 and the second outlet 415. For example, the manifold 630 can receive fluid from both the first channel 345 and the second channel 345.

Method 900 can include an apparatus with any number of members 310 with any number of channels and any number of battery cells 120. For example, as shown in FIG. 7, among others, the apparatus 300 can include two sidewalls 645, three members 310e-g and four subsets of battery cells 120. The battery cells 120 of a first subset can interface with the first sidewall 645 and the first member 310e. The battery cells 120 of a second subset can interface with the first member 310e and the second member 310f. The battery cells 120 of a third subset can interface with the second member 310f and the third member 310g. The battery cells 120 of the fourth subset can interface with the third member 310g and the second sidewall 645. The members 310e-g can have at least one channel 345. At least one manifold 630 can fluidly couple any number of channels 345.

Some of the description herein emphasizes the structural independence of the aspects of the system components or groupings of operations and responsibilities of these system components. Other groupings that execute similar overall operations are within the scope of the present application. The systems described above can provide multiple of any or each of those components and these components can be provided on either a standalone system or on multiple instantiations in a distributed system.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. For example, reference to member 310 can refer to any members 310a-g. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
   a first member defining a first channel;
   a second member having a first member side and a second member side opposite the first member side, the first member side facing the first member, the second member defining a second channel that extends along the first member side and a third channel that extends along the second member side, wherein the second channel is opposite from and adjacent to the third channel;
   the first member configured to interface with a first side of a first battery cell;
   the first member side of the second member configured to interface with a second side of the first battery cell and the second member side of the second member configured to interface with a first side of a second battery cell;
   the first member comprising a first inlet and a first outlet;
   the second member comprising a second inlet and a second outlet; and
   a manifold extending between the first outlet and the second inlet to fluidly couple the first member with the second member.

2. The apparatus of claim 1, wherein the first member and the second member are extrusions, and wherein the extrusions are configured to interface with the first side and the second side of the battery cell to control a temperature of the battery cell.

3. The apparatus of claim 1, comprising:
   the first member disposed parallel with the second member, wherein the first side of the battery cell is disposed opposite the second side of the battery cell.

4. The apparatus of claim 1, comprising:

the first member comprising a first inlet and a first outlet, the first channel comprising a single pass extending a length of the first member to fluidly couple the first inlet with the first outlet; and the second member comprising a second inlet and a second outlet, the second channel comprising a single pass extending a length of the second member to fluidly couple the second inlet with the second outlet.

5. The apparatus of claim 1, comprising:

the first member comprising a first inlet and a first outlet, the first channel comprising a plurality of passes extending along a length of the first member to fluidly couple the first inlet with the first outlet; and the second member comprising a second inlet and a second outlet, the first channel comprising a plurality of passes extending along a length of the second member to fluidly couple the second inlet with the second outlet.

6. The apparatus of claim 1, comprising:

the first member comprising a first end and a second end, the first end defining an inlet to receive a fluid and the second end defining an outlet to expel the fluid, the first channel comprising a serpentine configuration to fluidly couple the inlet with the outlet.

7. The apparatus of claim 1, wherein the first channel has a sinusoidal configuration comprising a plurality of waves extending between a top of the first member and a bottom of the first member.

8. The apparatus of claim 1, comprising:

the second channel fluidly coupled with the third channel to facilitate fluid flowing from the second channel to the third channel.

9. The apparatus of claim 1, comprising:

a first element to be disposed between the first member and the first side of the first battery cell; and a second element to be disposed between the second member and the second side of the first battery cell, the first element and the second element comprising thermal properties configured to facilitate heat transfer between the first battery cell and the first and second members.

10. The apparatus of claim 1, wherein the battery cell is a prismatic battery cell, wherein the first side of the prismatic battery cell is flat to interface with a flat member side of the first member and the second side of the prismatic battery cell is flat to interface with a flat member side of the second member.

11. The apparatus of claim 1, wherein the first member and the second member are structural members of a battery pack configured to support other components of the battery pack.

12. The apparatus of claim 1, comprising:

a plurality of battery cells;

a first side of each of the plurality of battery cells configured to interface with the first member and a second side of each of the plurality of battery cells configured to interface with the second member; and the first channel configured to facilitate heat transfer with the first side of each of the plurality of battery cells and the second channel configured to facilitate heat transfer with the second side of each of the plurality of battery cells.

13. The apparatus of claim 1, comprising:

the first member side of the second member to interface with the second side of the first battery cell to thermally couple the second channel with the first battery cell and the second member side of the second member to interface with the second battery cell to thermally couple the third channel with the second battery cell; and the first member to interface with the first side of the first battery cell to thermally couple the first channel with the first battery cell.

14. A battery pack, comprising:

a first battery cell and a second battery cell disposed within the battery pack;

a first member defining a first channel;

a second member having a first member side and a second member side opposite the first member side, the first member side facing the first member, the second member defining a second channel that extends along the first member side and a third channel that extends along the second member side, wherein the second channel is opposite from and adjacent to the third channel;

the first member configured to interface with a first side of the first battery cell;

the first member side of the second member configured to interface with a second side of the first battery cell and the second member side of the second member configured to interface with a first side of the second battery cell;

the first member comprising a first inlet and a first outlet;

the second member comprising a second inlet and a second outlet; and a manifold extending between the first outlet and the second inlet to fluidly couple the first channel with the second channel to facilitate fluid transfer from the first inlet to the second outlet.

15. A method, comprising:

providing a first member and a second member, the first member defining a first channel, and the second member having a first member side and a second member side opposite the first member side, the first member side facing the first member, the second member defining a second channel that extends along the first member side and a third channel that extends along the second member side, wherein the second channel is opposite from and adjacent to the third channel;

interfacing the first member with a first side of a first battery cell;

interfacing the first member side of the second member with a second side of the first battery cell;

interfacing the second member side of the second member with a first side of a second battery cell; and connecting the first channel with the second channel via a manifold, the manifold extending from an outlet of the first channel to an inlet of the second channel.

\* \* \* \* \*